US012405772B2

(12) United States Patent
Ryan

(10) Patent No.: US 12,405,772 B2
(45) Date of Patent: Sep. 2, 2025

(54) MANAGING AN APP, FOR EXAMPLE DEVELOPING AN APP COMPRISING UPDATING A WORKFLOW OF THE APP, METHOD, AND SYSTEM

(71) Applicant: Mendix Technology B.V., AP Rotterdam (NL)

(72) Inventor: Sean Ryan, The Hague (NL)

(73) Assignee: Mendix Technology B.V., AP Rotterdam (NL)

( * ) Notice: Subject to any disclaimer, the term of this patent is extended or adjusted under 35 U.S.C. 154(b) by 0 days.

(21) Appl. No.: 18/722,782

(22) PCT Filed: Dec. 22, 2021

(86) PCT No.: PCT/EP2021/087262
§ 371 (c)(1),
(2) Date: Jun. 21, 2024

(87) PCT Pub. No.: WO2023/117074
PCT Pub. Date: Jun. 29, 2023

(65) Prior Publication Data

US 2024/0419409 A1 Dec. 19, 2024

(51) Int. Cl.
*G06F 9/44* (2018.01)
*G06F 3/0486* (2013.01)
(Continued)

(52) U.S. Cl.
CPC .............. *G06F 8/34* (2013.01); *G06F 3/0486* (2013.01)

(58) Field of Classification Search
CPC ................................ G06F 8/34; G06F 3/0486
See application file for complete search history.

(56) References Cited

U.S. PATENT DOCUMENTS 5,737,622 A * 4/1998 Rogers .................. G06F 3/0481 715/835
7,046,246 B2 5/2006 Saitou
(Continued)

FOREIGN PATENT DOCUMENTS

CN 108292206 A 7/2018
CN 112567378 A * 3/2021 ........... A61B 5/0022
CN 112783604 A 5/2021

OTHER PUBLICATIONS

Andrzej Jasinski, A Workflow Management Framework for the Dynamic Generation of Workflows that is Independent of the Application Environment, May 2021, pp. 1-9. https://ieeexplore.ieee.org/stamp/stamp.jsp?tp=&arnumber=9463939 (Year: 2021).*
(Continued)

*Primary Examiner* — Mongbao Nguyen
(74) *Attorney, Agent, or Firm* — Lempia Summerfield Katz LLC

(57) ABSTRACT

For an improved management of an app (120), a computer-implemented method is suggested comprising: •capturing the user's intent to insert an additional workflow artifact (122*a*) into the workflow (124) in response to user interactions with the app development UI (116); •inserting the additional workflow artifact (122*a*) to the workflow (124) according into the captured user's intent; •determining an overlap (126) of at least two of the workflow artifacts (122) caused by the inserted workflow artifact (122*a*); •determining a flow direction (128) of the workflow (124) from the preceding workflow artifact (122*p*) to the following workflow artifact (122*f*), the preceding and the following workflow artifact (122*p*, 122*f*) preceding and following the inserted workflow artifact (122*a*), respectively; •determining at least one workflow artifact (122*m*) of the workflow (124) which needs to be moved along the determined flow direction (128) to avoid the determined overlap (126);
(Continued)

Start M02 M M04 M06 M08 M10 M12 M14 M16 M18 M20 M22 End M24

•determining an updated workflow (124') by moving the respective, determined workflow artifact (122*m*) along the determined flow direction (128) at least until the determined overlap (126) is removed; •displaying at least the preceding workflow artifact (122*p*), the inserted workflow artifact (122*a*), and the following workflow artifact (122*f*) to the user in the app development UI (116); and •developing the app (120) through the app development UI (116) by using the updated workflow (124').

13 Claims, 10 Drawing Sheets

(51) Int. Cl.

| | |
|---|---|
| ***G06F 8/34*** | (2018.01) |
| ***G06F 9/445*** | (2018.01) |
| ***G06F 9/455*** | (2018.01) |

(56) References Cited

U.S. PATENT DOCUMENTS

| | | | | |
|---|---|---|---|---|
| 9,250,872 | B2 * | 2/2016 | Sullivan | G06F 8/38 |
| 11,681,505 | B2 * | 6/2023 | Mukherjee | G06F 8/60 717/107 |
| 2002/0154117 | A1 * | 10/2002 | Saitou | G06T 11/206 345/440 |
| 2006/0236304 | A1 * | 10/2006 | Luo | G06F 8/34 717/105 |
| 2010/0050183 | A1 | 2/2010 | Ogura | |
| 2014/0040792 | A1 | 2/2014 | Kodosky | |
| 2014/0282193 | A1 * | 9/2014 | Bann | G05B 19/409 715/771 |
| 2017/0147190 | A1 * | 5/2017 | Twist | G06F 3/0481 |
| 2017/0147296 | A1 | 5/2017 | Kumar | |
| 2017/0315782 | A1 * | 11/2017 | Chaudhry | G06F 9/4881 |
| 2021/0096828 | A1 * | 4/2021 | Pike | G06F 3/0482 |
| 2021/0382611 | A1 * | 12/2021 | Gan | G06F 8/34 |
| 2021/0389933 | A1 * | 12/2021 | Van Ijzendoorn | G06F 8/71 |
| 2022/0308918 | A1 * | 9/2022 | Pandey | G06F 8/30 |

OTHER PUBLICATIONS

English translation, Buckler (CN 112567378 A), 2021, pp. 1-52 (Year: 2021).*

PCT Preliminary Examination Report mailed Dec. 13, 2023, corresponding to PCT International Application No. PCT/EP2021/087262.

Marriott, Kim, et al. "Removing node overlapping in graph layout using constrained optimization." Constraints 8 (2003): 143-171.

* cited by examiner 160
162
100
110
118
108
Internal Data Store
120
124
122
122
102
104
106
Application Software Component
Memory
Processor
112
114
116
126
128
122f,122m
122p
122a
124
122p
122a
122f
124'

Internal
Data
Store
Application Software
Component
Memory
Processor
100
102
104
106
108
110
112
114
116
118
120
122
122
124
126
128
130
132
150
152
154
160
162
124'
122f, 122m
122p
122a
124
122p
122a
122f
124'

124
124'
122fffa
122ff, 140
142
122fffb
126
122f, 122m
122a
122-4fb
128
122p
146
122-5fb
122pp
122-6fb 128
124
144
142
122f, 122m
122ff
122a
126
122sp2
122pp
122p, 140
142
122sp3
124'
144
122a
122f,
122m
122ff
122sp2
122pp
122p, 140
122sp3

124
122pp
122p
126
122a
128
138
136
122f, 122m
139
122lf
124'
122pp
122p
136
122a
138
139
122f
126
128
122lf
124"
122pp
122p
136
122a
138
139
122f
128
126
122lf

1000
Display
1010
Memory
1006
Graphics Controller
1008
1002
Processor
Buses / Controllers
1004
1024
Storage Controller
1016
I / 0 Controller
1012
Communication Controller
Storage
1026
1028
OS
1030
Software / Firmware
1032
Data Store
Input Devices
1018
Output Devices
1020
Other Hardware
1022
Network
1014
Server
1034

MANAGING AN APP, FOR EXAMPLE DEVELOPING AN APP COMPRISING UPDATING A WORKFLOW OF THE APP, METHOD, AND SYSTEM

CROSS REFERENCE TO RELATED APPLICATIONS

The present patent document is a § 371 nationalization of PCT Application Serial Number PCT/EP2021/087262, filed Dec. 22, 2021, designating the United States which is hereby incorporated in its entirety by reference.

FIELD

The present disclosure is directed, in general, to software management systems, for example systems for developing apps, that may be used to manage, build, test, deploy and iterate such apps (collectively referred to herein as product systems).

BACKGROUND

Recently, an increasing number of computer software products are used both for personal needs and for business needs in the form of applications, throughout the present document simply called “apps”. Such apps may be used in a mobile context as well as on cloud computing platforms and “on premise” and may provide a specific set of functions.

Currently, there exist product systems and solutions which support managing or developing such apps. Such product systems may benefit from improvements.

BRIEF SUMMARY AND DESCRIPTION

Embodiments provide methods and computer systems that may be used to facilitate managing an app.

According to a first aspect, a computer-implemented method of managing an app may include: providing an app development user interface (UI) to a user for developing the app; displaying at least two workflow artifacts of a workflow of the app to the user in the app development UI; capturing the user’s intent to insert an additional workflow artifact into the workflow in response to user interactions with the app development UI; inserting the additional workflow artifact into the workflow according to the captured user’s intent; determining an overlap of at least two of the workflow artifacts caused by the inserted workflow artifact; determining a flow direction of the workflow from the preceding workflow artifact to the following workflow artifact, the preceding and the following workflow artifact preceding and following the inserted workflow artifact, respectively; determining at least one workflow artifact of the workflow which needs to be moved along the determined flow direction to avoid the determined overlap; determining an updated workflow by moving the respective, determined workflow artifact in the direction of the determined flow direction at least until the determined overlap is removed; displaying at least the preceding workflow artifact, the inserted workflow artifact and the following workflow artifact to the user in the app development UI; and developing the app through the app development UI by using the updated workflow; determining a moving borderline in the workflow. A moving borderline intersects the preceding workflow artifact and is perpendicular to the determined flow direction; and determining an updated workflow by only moving one or more workflow artifacts which are arranged in the workflow at the same side of the moving borderline as the inserted artifact or the removed workflow artifact.

According to a second aspect, a computer system may be arranged and configured to execute the steps of this computer-implemented method of managing an app. For example, the described computer system may be arranged and configured to execute the following steps: providing an app development user interface (UI) to a user for developing the app; displaying at least two workflow artifacts of a workflow of the app to the user in the app development UI; capturing the user’s intent to insert an additional workflow artifact into the workflow in response to user interactions with the app development UI; inserting the additional workflow artifact into the workflow according to the captured user’s intent; determining an overlap of at least two of the workflow artifacts caused by the inserted workflow artifact; determining a flow direction of the workflow from the preceding workflow artifact to the following workflow artifact, the preceding and the following workflow artifact preceding and following the inserted workflow artifact, respectively; determining at least one workflow artifact of the workflow which needs to be moved along the determined flow direction to avoid the determined overlap; determining an updated workflow by moving the respective, determined workflow artifact in the direction of the determined flow direction at least until the determined overlap is removed; displaying at least the preceding workflow artifact, the inserted workflow artifact, and the following workflow artifact to the user in the app development UI; and developing the app through the app development UI by using the updated workflow; determining a moving borderline in the workflow. The moving borderline intersects the preceding workflow artifact and is perpendicular to the determined flow direction; and determining an updated workflow by only moving one or more workflow artifacts which are arranged in the workflow at the same side of the moving borderline as the inserted artifact or the removed workflow artifact.

According to a third aspect, a computer program product may include computer program code which, when executed by a computer system, cause the computer system to carry out this computer-implemented method of managing an app.

According to a fourth aspect, a computer-readable medium may include computer program code which, when executed by a computer system, cause the computer system to carry out this computer-implemented method of managing an app. By way of example, the described computer-readable medium may be non-transitory and may further be a software component on a storage device.

In some examples, the mentioned app development platform may be a visual model-based and/or low-code app development platform which is described in more detail below.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the detailed description below, it should be understood that various definitions for certain words and phrases are provided throughout this patent document and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
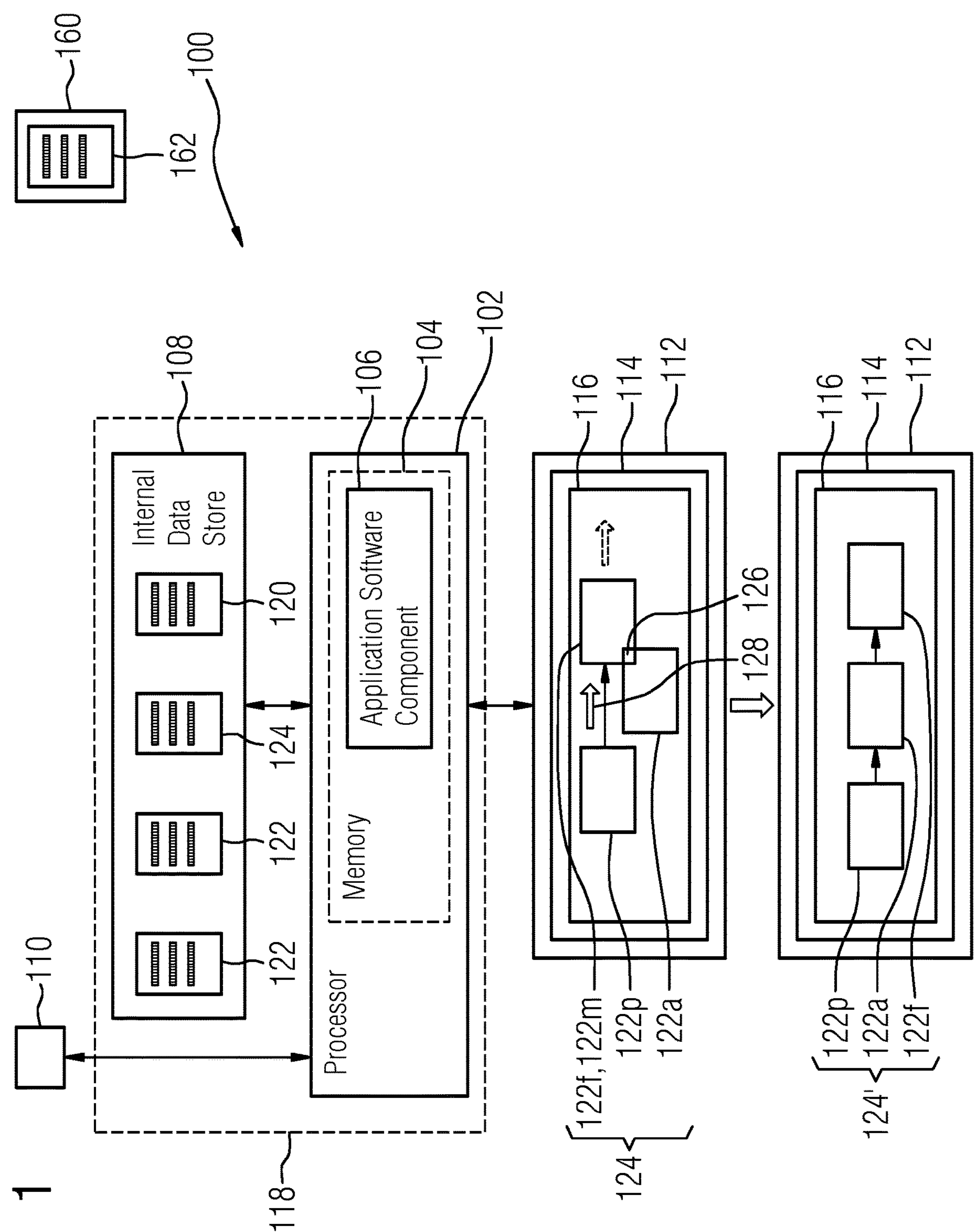
FIGS. 1-2 depict a functional block diagram of an example system that facilitates managing an app in a product system according to an embodiment.

Various technologies that pertain to systems and methods for managing apps, for example developing an app including updating a workflow of the app, in a product system are described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present patent document will be described with reference to exemplary non-limiting embodiments.

An app generally refers to a software program which on execution performs specific desired tasks. In general, several apps are executed in a runtime environment containing one or more operating systems ("OSs"), virtual machines (e.g., supporting Java™ programming language), device drivers, etc.

Apps, including native apps, may be created, edited, and represented using traditional source code. Examples of such traditional source code include C, C++, Java, Flash, Python, Perl, and other script-based methods of representing an app. Developing, creating, and managing such script-based apps, or parts of such script-based apps may be accomplished by manual coding of suitably trained users.

Developers often use Application Development Frameworks ("ADFs") (which are by themselves applications or apps) for implementing/developing desired apps. An ADF provides a set of pre-defined code/data modules that may be directly/indirectly used in the development of an app. An ADF may also provide tools such as an Integrated Development Environment ("IDE"), code generators, debuggers, etc. that facilitate a developer in coding/implementing the desired logic of the app in a faster/simpler manner.

In general, an ADF simplifies app development by providing reusable components that may be used by app developers to define user interfaces ("UIs") and app logic by, for example, selecting components to perform desired tasks and defining the appearance, behavior, and interactions of the selected components. Some ADFs are based on a model-view-controller design pattern that promotes loose coupling and easier app development and maintenance.

According to another approach, apps may also be created, edited, and represented using visual model-based representations. Unlike traditional source code implementations, such apps may be created, edited, and/or represented by drawing, moving, connecting, and/or disconnecting visual depictions of logical elements within a visual modeling environment. Visual model-based representations of apps may use symbols, shapes, lines, colors, shades, animations, and/or other visual elements to represent logic, data or memory structures or user interface elements. In order to program a traditional script-based app, programmers are typically required to type out detailed scripts according to a complicated set of programming syntax rules. In contrast, programming a visual model-based app may, in some cases, be done by connecting various logical elements (e.g., action blocks and/or decision blocks) to create a visual flow chart that defines the app's operation. Similarly, defining data structures (e.g., variable types, database objects, or classes) and/or user interface elements (e.g., dropdown boxes, lists, text input boxes) in a visual model-based app may be done by drawing, placing, or connecting visual depictions of logical elements within a virtual workspace, as opposed to typing out detailed commands in a script. Visual-model based apps, including native apps, may therefore be more intuitive to program and/or edit compared to traditional script-based apps. In the present document, an approach is suggested to manage apps, for example to develop an app including a trained function, that may involve the explained visual model-based representations.

For brevity, references to a "model," a "visual model," or an "application" or "app" should be understood to refer to visual model-based apps, including native apps, unless specifically indicated. In some cases, such visual model-based apps may represent complete, stand-alone apps for execution on a computer system. Visual model-based apps may also represent discrete modules that are configured to perform certain tasks or functions, but that do not represent complete apps-instead, such discrete modules may be inserted into a larger app or combined with other discrete modules to perform more complicated tasks. Examples of such discrete modules may include modules for validating a ZIP code, for receiving information regarding current weather from a weather feed, and/or for rendering graphics.

Visual models may be represented in two forms: an internal representation and one or more associated visual representations. The internal representation may be a file encoded according to a file format used by a modeling environment to capture and define the operation of an app (or part of an app). For example, the internal representation may define what inputs an app may receive, what outputs an app may provide, the algorithms and operations by which the app may arrive at results, what data the app may display, what data the app may store, etc. The internal representation may also be used to instruct an execution environment how to execute the logic of the app during run-time. Internal representations may be stored in the form of non-human-readable code (e.g., binary code). Internal representations may also be stored according to a binary stored JSON (java script object notation) format, and/or an XML format. At run-time, an execution engine may use an internal representation to compile and/or generate executable machine code that, when executed by a processor, causes the processor to implement the functionality of the model.

The internal representation may be associated with one or more visual representations. Visual representations may include visual elements that depict how an app's logic flows, but which are not configured to be compiled or executed. The visual representations may include, for example, flowcharts or decision trees that show a user how the app will operate. The visual models may also visually depict data that is to be received from the user, data that is to be stored, and data that is to be displayed to the user. The visual models may also be interactive, that allows a user to manipulate the model in an intuitive way. For example, visual representations may be configured to display a certain level of detail (e.g., number of branches, number of displayed parameters, granularity of displayed logic) by default. However, users may interact with the visual representation in order to show a desired level of detail—for example, users may display or hide branches of logic, and/or display or hide sets of parameters. Details relating to an element of the visual model may be hidden from view by default but may appear in a sliding window or pop-up that appears on-screen when the user clicks on the appropriate element. Users may also zoom in or out of the model, and/or pan across different parts of the model, to examine different parts of the model. Users may also copy or paste branches of logic from one section of the model into another section, or copy/paste branches of logic from a first model into a second model. In some cases, parts of the model may contain links to other parts of the model, such that if a user clicks on a link, the user will automatically be led to another part of the model. A viewing user may interact with a visual representation in at least some of the same ways that the viewing user might interact with the model if it were displayed within a modeling environment. In other words, the visual representation may be configured to mimic how the model might appear if it were displayed within a visual modeling environment. A single internal representation may correspond to multiple visual representations that use different styles or formatting rules to display app logic. For instance, multiple visual representations corresponding to the same internal representation may differ from one another in their use of color, elements that are included or omitted, and use of symbols, shapes, lines, colors, and/or shades to depict logic flow.

Approaches involving the above-described functionalities of visual model-based representations, visual model-based apps, and/or visual models are sometimes understood to be included by a so-called low-code application development platform or low-code app development platform. By way of example, such a low-code application development platform may further be described as software that provides a development environment used to create application software through graphical user interfaces and configuration instead of traditional hand-coded computer programming. A low-code model may enable developers of varied experience levels to create applications using a visual user interface in combination with model-driven logic. Such low-code application development platforms may produce entirely operational apps or require additional coding for specific situations. Low-code app development platforms may reduce the amount of traditional hand coding, enabling accelerated delivery of business apps. A common benefit is that a wider range of people may contribute to the app's development—not only those with formal programming skills. Low-code app development platforms may also lower the initial cost of setup, training, deployment, and maintenance.

With reference to FIG. 1, a functional block diagram of an example computer system or data processing system 100 is depicted that facilitates managing apps 120, for example developing an app 120 including updating a workflow 124 of the app 120. The processing system 100 may include a (visual model-based) app development platform 118 including at least one processor 102 that is configured to execute at least one application software component 106 from a memory 104 accessed by the processor 102. Herein, the app development platform 118 may include the above-described functionalities of visual model-based representations, visual model-based apps, and/or visual models and, by way of example, be a visual model-based app development platform or a low-code app development platform. The application software component 106 may be configured (i.e., programmed) to cause the processor 102 to carry out various acts and functions described herein. For example, the described application software component 106 may include and/or correspond to one or more components of an app development application that is configured to generate and store product data in a data store 108 such as a database. Furthermore, the described application software component 106 may include and/or correspond to one or more components of an app creation or development application.

By way of example, the app development platform 118 may be cloud-based, internet-based and/or be operated by a provider providing app development and creation support, including e.g., supporting low-code and/or visual model-based app development. The user may be located close to the app development platform 118 or remote to the app development platform 118, e.g., anywhere else, e.g., using a mobile device for connecting to the app development platform 118, e.g., via the internet. The mobile device may include an input device 110 and a display device 112. In some examples, the app development platform 118 may be installed and run on a user's device, such as a computer, laptop, pad, on-premises computing facility, or the like.

Examples of product systems that may be adapted to include the app management and/or development including updating a workflow of the app features described herein may include the low-code software development platform of Mendix Inc., of Boston, Massachusetts, USA. This platform provides tools to build, test, deploy, iterate, develop, create, and manage apps 120 and is based on visual, model-driven software development. However, the systems and methods described herein may be used in other product systems (e.g., product lifecycle management (PLM), product data management (PDM), application lifecycle management (ALM) systems) and/or any other type of system that generates and stores product data in a database. Also, examples of databases that may be used as one or more data stores described herein include database server applications such as Oracle, Microsoft SQL Server, or any other type of data store that is operative to store data records.

It may be difficult and time-consuming to manage apps 120, for example developing an app 120 including updating a workflow 124 of the app 120, in complex app development and/or management environments. For example, advanced coding or software development or management knowledge of users may be required, or selections of many options need to be made consciously, both involving many manual steps, that is a long and not efficient process.

To enable the enhanced management apps 120, for example developing an app 120 including updating a workflow 124 of the app 120, the described product system or processing system 100 may include at least one input device 110 and at least one display device 112 (such as a display screen). The described processor 102 may be configured to generate a graphical user interface (GUI) 114 through the display device 112. Such a GUI 114 may include GUI elements such as buttons, links, search boxes, lists, text boxes, images, scroll bars usable by a user to provide inputs through the input device 110 that cause updating the workflow 124 and/or developing the app 120. By way of example, the GUI 114 may include an app development UI 116 provided to a user for developing the app 120.

In an example embodiment, the application software component 106 and/or the processor 102 may be configured to provide an app development user interface (UI) 116 of an app development platform 118 to a user for developing the app 120.

As mentioned above, the app development platform 118 may include the above-described functionalities of visual model-based representations, visual model-based apps, and/or visual models and, by way of example, be a visual model-based app development platform or a low-code app development platform. The app development UI 116 may provide an interactive user interface of the app development platform 118 that supports and enables the user to develop the app 120. By way of example, the app 120 may be or include a software program which on execution performs specific desired tasks.

In some examples, the application software component 106 and/or the processor 102 may further be configured to display at least two workflow artifacts 122 of a workflow 124 of the app 120 to the user in the app development UI 116.

Herein, a workflow 124 may generally be considered to include an orchestrated and repeatable pattern of activity, enabled by the systematic organization of resources into processes that may transform materials, provide services, or process information. A workflow 124 may be depicted as a sequence of operations, the work of a person or group, the work of an organization of staff, or one or more simple or complex mechanisms. In the context of apps 120 and the development of apps 120, the workflow 124 may describe or characterize the pattern of activity that may be executed by the developed and deployed app 120. The workflow 124 may, in some sense, express a logic of the app 120. Hence, executing the workflow 124 that may correspond to the given business logic, and that may be included by the developed and deployed app 120 may contribute to fulfill a certain business need. In some examples, the workflow 124 may include two or more workflow artifacts 122 that may form the mentioned pattern, and that may correspond to single activities of the mentioned pattern.

In some app development platforms 118, such a workflow 124 may be known as a microflow or a nanoflow. Like workflows 124 of apps 120 in general, such microflows or a nanoflows may perform actions, e.g., the above-mentioned workflow artifacts 122, such as creating and updating objects, showing pages, and making choices. Such choices may be decisions, i.e., e.g., workflow artifacts 122 that may make a choice based on a condition and follow one and only one of the outgoing paths. For example, for an app 120 in the context of onboarding new hires, you need to use a decision to follow different paths when a new hire works remotely or when they work from the office. In an industrial context, the app 120 may include a decision on whether to stop the production process of a device, e.g., a production machine, e.g., based on input data 152 of the device, such as condition monitoring data or status data relating to the device. In some examples, the mentioned device may correspond to the below mentioned target device 150 or other device. Such decision workflow artifacts 122 may, e.g., include an exclusive split that is an element that makes a choice based on a condition and follows (exactly) one of the outgoing sequence flows. Such decision workflow artifacts 122 may, e.g., further include an inheritance split that is an element that makes a choice based on the type of a certain variable. For each specialization of the variable, the workflow 124 may continue in a different way. Further, such decision workflow artifacts 122 may, e.g., include a parallel split that may be used to have parallel processes in your workflow 124. Such parallel processes or the above-mentioned outgoing sequence flows may also be understood as partial flows 142 of a workflow 124 that are explained below. For example, when onboarding a new employee, you may have several processes running in parallel: the human recourses department preparing necessary documents, the IT department preparing a workstation, and the administration department scheduling a training for the employee. In some examples, such decision workflow artifacts 122 may be understood as a split artifact 140 that is explained below.

Accordingly, there may be workflow artifacts 122 that may merge processes running in parallel or which combine multiple sequence flows into one sequence flow. There may, e.g., be situations where the workflow 124 has been separated in the part preceding the merge to execute specific actions. After this, the same action needs to be executed for all the separated flows. In this situation a merge may be used to avoid redundancy. In some examples, such merge workflow artifacts 122 may be understood as a merge artifact 148 that is explained below, and that merges partial flows 142.

For example in the context of low code app development, the workflow 124 may be understood as a visual way of expressing what traditionally ends up in textual program code.

In some app development platforms 118, microflows may run in the runtime server and may therefore, in some examples, not be used in offline apps, while nanoflows may run directly on the browser or the target device 150 and may, in some examples, be used in an offline app. Furthermore, most of the actions in nanoflows may run directly on the target device 150, so there may also be a speed benefit for logic that does not need access to the server.

By way of example, the workflow artifacts 122 may correspond to one or more activities executed by the app 120, e.g., accessing input data 152, manipulating the input data 152, generating output data 154, user interactions, such as capturing queries of the app user, displaying data, e.g., input data 152 or output data 154 to the app user, or transmitting the output data 154 to some other app or device, e.g., the device connected to the target device 150. The workflow artifacts 122 may further relate, as already mentioned above, to creating and updating objects, showing pages, and making choices.

In further examples, the application software component 106 and/or the processor 102 may further be configured to capture the user's intent to insert an additional workflow artifact **122*a* into the workflow 124 in response to user interactions with the app development UI 116**.

E.g., for the purposes of further developing the app 120, the user may want to insert an additional workflow artifact **122*a* into the workflow 124. The user may, in some examples, express their intent by dragging and dropping the additional workflow artifact 122*a* in the workflow 124 displayed in the app development UI 116. This may be done, e.g., by dragging and dropping the additional workflow artifact 122 between two neighboring workflow artifacts 122 or on one of the workflow artifacts 122, for example, using the input device 110. Herein, in some examples, the additional workflow artifact 122***a* may be an additional action that the user wants to insert in the existing workflow 124 of the app 120 that he or she develops.

In further examples, the additional workflow artifact 122*a* may be chosen from a library or from templates that are made available to the user by the app development platform 118 and/or that may be created by the user and/or that may be imported by the user from somewhere else, e.g., from other data sources available in the internet.

In some examples, the user intent may be to move one of the workflow artifacts 122 of the workflow 124 from an initial position to a final position within the workflow 124. This user intent may be understood as deleting this specific workflow artifact 122 at the initial position from the workflow 124 and inserting the specific workflow artifact 122 at the final position in the workflow 124. Herein, the insertion of this specific workflow artifact 122 at the final position in the workflow 124 may be understood as inserting this specific workflow artifact 122 as the additional workflow artifact 122*a* into the workflow 124 at the final position. The resulting overlap 126 at the final position may then be removed according to the approach described below.

By way of example, the application software component 106 and/or the processor 102 may further be configured to insert the additional workflow artifact 122*a* into the workflow 124 according to the captured user's intent.

The app development platform 118 may then put the additional workflow artifact 122*a* in the workflow 124 as desired by the user. In some examples, the previously defined workflow 124 may not yet be rearranged to accommodate the additional workflow artifact 122*a*. In further examples, if the additional workflow artifact 122*a* is inserted between a preceding workflow artifact 122*p* and a following workflow artifact 122*f*, the additional workflow artifact 122*a* may be put at the initial position of the following workflow artifact 122*f* or in the vicinity the initial position of the following workflow artifact 122*f*, e.g., towards the preceding workflow artifact 122*p*, to obtain the amended workflow 124'.

In some examples, the application software component 106 and/or the processor 102 may further be configured to determine an overlap 126 of at least two of the workflow artifacts 122 caused by the inserted workflow artifact 122*a*.

Generally, inserting the additional workflow artifact 122*a* may lead to an overlap 126 of workflow artifacts 122 of the workflow 124 that now includes the inserted workflow artifact 122*a* as well. Herein, an overlap 126 may be understood as one of the workflow artifacts 122, 122*a* of the workflow 124 to extend over or past and cover a part of another workflow artifact 122, 122*a* of the workflow 124. The respective overlapping workflow artifacts 122, 122*a* may have the size as displayed to the user in the app development UI 116 or the respective overlapping workflow artifacts 122, 122*a* may have a larger size than displayed in the app development UI 116. Therefore, in some examples, the respective overlapping workflow artifacts 122, 122*a* may also overlap when displayed on the app development UI 116. In other examples, the respective overlapping workflow artifacts 122, 122*a* may be displayed in the app development UI 116 to be closer to each other than other, neighboring workflow artifacts 122. In such examples, the respective overlapping workflow artifacts 122, 122*a* may be displayed in the app development UI 116 as not overlapping although they do overlap since the respective overlapping workflow artifacts 122, 122*a* may have a larger size, respectively, than displayed in the app development UI 116.

In most examples, the inserted workflow artifact 122*a* may at least partly overlap with one of the workflow artifacts 122 that was already included by the workflow 124 prior to the insertion of the inserted workflow artifact 122*a*.

In further examples, the application software component 106 and/or the processor 102 may further be configured to determine a flow direction 128 of the workflow 124 from the preceding workflow artifact 122*p* to the following workflow artifact 122*f*, the preceding and the following workflow artifact 122*p*, 122*f* preceding and following the inserted workflow artifact 122*a*, respectively.

In some examples, the workflow 124 may be characterized by certain flow direction 128 linking the preceding workflow artifact 122*p* with the following workflow artifact 122*f*. The flow direction 128 may indicate the flow of workflow artifacts 122 and may, e.g., define that the preceding workflow artifact 122*p* may be executed before the following workflow artifact 122*f* may be executed. By way of example, the flow direction 128 may be indicated with arrows in the app development UI 116.

Hence, the flow direction 128 or sequence flow may, in some examples, be understood as a flow that may be shown in the app development UI 116 using one or more arrows that link(s) the workflow artifacts 122, such as events, activities, decisions, etc., with each other. Hereby, the flow direction 128 may define the order of execution. The flow direction 128 may generally flow in one direction where workflow artifacts 122 follow each other up one by one. When two activities or workflow artifacts 122 shall be linked together, the flow direction 128 or a sequence flow may be used.

For the sake of clarity, the flow direction 128 may link the proceeding workflow artifact 122*p* and the following workflow artifact 122*f* such that first, the proceeding workflow artifact 122*p* is executed and then, the following workflow artifact 122*f* is executed.

By way of example, the application software component 106 and/or the processor 102 may further be configured to determine at least one workflow artifact 122*m* of the workflow 124 that needs to be moved along the determined flow direction 128 to avoid the determined overlap 126.

The determination of the workflow artifact(s) 122*m* to be moved may involve the determination if the determined overlap 126 may be removed by moving a corresponding workflow artifact 122 of the workflow 124 along the determined flow direction 128. If the determined overlap may be removed by moving the respective workflow artifact 122, this respective workflow artifact 122 may be identified as the workflow artifact 122*m* to be moved. In many cases, the workflow artifact 122*m* to be moved may be the following workflow artifact 122*f*, i.e., the workflow artifact 122*f* that is following the inserted artifact 122*a* in the workflow 124 after the insertion of the inserted workflow 122*a*. In some examples, the workflow artifact 122*m* to be moved may be the preceding workflow artifact 122*p*, i.e., the workflow artifact 122*p* that is preceding the inserted artifact 122*a* in the workflow 124 after the insertion of the inserted workflow 122*a*.

In further examples, the application software component 106 and/or the processor 102 may further be configured to determine an updated workflow 124' by moving the respective, determined workflow artifact 122*m* along the determined flow direction 128 at least until the determined overlap 126 is removed.

The determined workflow artifact 122*m* to be moved may then be moved in the workflow 124 along the determined flow direction 128 at least until the determined overlap 126 is removed to obtain an updated workflow 124'. Generally, by way of example, the movement of the determined workflow artifact 122*m* may be stopped as soon as the determined overlap 126 is removed. Moving the determined workflow artifact 122*m* may sometimes be called nudging since the determined workflow artifact 122*m* may only gently or gradually be moved, but also since this approach tries to keep the general layout of the workflow 124.

By way of example, the application software component 106 and/or the processor 102 may further be configured to display at least the preceding workflow artifact 122*p*, the inserted workflow artifact 122*a*, and the following workflow artifact 122*f* to the user in the app development UI 116.

Herein, in some examples, the preceding workflow artifact 122*p*, the inserted workflow artifact 122*a*, and the following workflow artifact 122*f* may be displayed to the user after the insertion of the inserted workflow artifact 122*a* and after moving the determined workflow artifact 122*m* to obtain the updated workflow 124'. In other words, at least the three mentioned workflow artifacts 122*p*, 122*a*, 122*f* of the updated workflow 124' may be displayed to the user in the app development UI 116.

Displaying the proceeding workflow artifact 122*p*, the inserted workflow artifact 122*a*, and the following workflow artifact 122*f* in the app development UI 116, may allow the user to retrace the amendments made to the original workflow 124 to obtain the updated workflow 124' and to check the updated workflow 124'. In some examples, the user may confirm or discard the updated workflow 124' by corresponding user interactions with the app development UI 116. The suggested update mechanism of the workflow 124 to obtain the updated workflow 124' may provide very good results that may both comply with the user's insert intent and provide an updated workflow 124' that may readily be used by the app development platform 118 to create or develop the app 120.

In further examples, the application software component 106 and/or the processor 102 may further be configured to develop the app 120 through the app development UI 116 by using the updated workflow 124'.

Using the updated workflow 124', the app 120 may be developed through the app development UI 116 that may interact, by way of example, with an ADF, IDE, visual model-based representations or the above-mentioned (low-code) app development platform 118 to accomplish the development of the app 120. Herein, the app development platform 118 together with the updated workflow 124' may be suitable to support non-expert users to insert the additional workflow artifacts 122 in the workflow and then to develop the app 120 including the updated workflow 124'.

The suggested method may be suitable to preserve the layout of the workflow 124 to obtain the updated workflow 124' after the insertion of the additional workflow artifact 122*a*. This may e.g., be achieved by avoiding overlapping workflow artifacts 122, by avoiding crossing flows in the workflow 124, by avoiding resetting the user's layout of the workflow 124, and/or by allowing for future expansion of the workflow 124, e.g., by introducing decision splits, loops, etc.

Hence, the suggested method may make sure that an updated workflow 124' may be obtained that may be interpreted by the app development platform 118 in a meaningful and consistent way. Therefore, the suggested method may avoid contradictions and broken or crossing flows in the updated workflow 124' that may lead to inconsistencies and issues when the app development platform 118 tries to develop or create the app 120 based on such an inconsistent or contradictory, updated workflow 124'. The suggested method may consequently considerably help to facilitate the app development, for example, for non-expert app developers.

Other approaches, e.g., relating to macro layout algorithms, such as dot, twopi, neato or the Sugiyama algorithm, may tend to rewrite the entire graph layout that may have severe drawbacks. For example, a user, esp. a non-expert app developer, might not recognize their initial workflow 124 anymore and might get lost during the development of their app 120. This might hinder further amendments, such as the insertion of yet further workflow artifact 122 to the workflow 124, that, however, is regularly required many times during the development of a workflow 124 of an app 120 or of an app 120.

Further, according to yet other approaches, the user may take care of the layout of the workflow 124 themselves to obtain the updated workflow 124' after the insertion of the additional workflow artifact 122*a*. This approach, however, may involve many manual steps, e.g., involving manual coding, that may only be performed by suitably trained users. Also, this approach is time-consuming and error-prone.

Contrary to these other approaches, the suggested method may embody a sort of low-code approach for a user to create a logic layout of the workflow 124 and to develop the app 120. Particularly, the suggested method may take away the burden from the user to manually amend or correct a workflow logic when adding, but also when moving or deleting workflow artifacts 122 in a workflow 124. Advantages of the suggested approach include visually displaying to the user what is amended by the suggested update of the workflow 124. Hence, the user may still keep the control of the applied changes, also since according the suggested approach, only small changes may be done to the workflow 124 that is hence corresponding to a "micro" aspect opposed to the above-mentioned macro layout algorithms.

It should further be appreciated, that the suggested approach may be applicable to the above-mentioned app development platforms 118 that provide workflows 124 as a microflows or a nanoflows.

in some examples, the application software component 106 and/or the processor 102 may further be configured to determine a moving borderline 146 in the workflow 124. The moving borderline 146 intersects the preceding workflow artifact 122*p* and is perpendicular to the determined flow direction 128; and to determine an updated workflow 124' by only moving one or more workflow artifacts 122 that are arranged in the workflow 124 at the same side of the moving borderline 146 as the inserted artifact 122*a* or the removed workflow artifact 122*r*.

The use of the described moving borderline 146 may be advantageous for more complex or advanced workflows 124. Such more complex workflows 124 may include curves at which workflow artifacts 122 may be arranged so that the workflow 124 may cross or intersect the determined moving borderline 146 once or several times. For example, a workflow 124 with an S-shape or a Z-shape. The moving borderline may be a vertical line that splits this workflow 124 into the right half and the left half. Such a workflow 124 crosses or intersect this moving borderline 146 three times, namely at the top, at the middle and at the bottom of the shape of the workflow 124.

The moving borderline 146 may be determined to intersect the workflow 124 at the preceding workflow artifact 122*p* and may be perpendicular to the determined flow direction 128. The updated workflow 124' may then be determined by only moving artifacts 122 that are arranged at the same side of the moving borderline 146 as the inserted workflow artifact 122*a* or the removed workflow artifact 122*r*. In other words, in some examples, workflow artifacts that are arranged at the same side of the moving borderline 146 as the preceding workflow artifact 122*p* may not be moved.

This rather simple approach may turn out to be very efficient and failsafe. It is rather easy to implement and yet considerably contributes to preserve the layout of the workflow 124.

Figure 5:
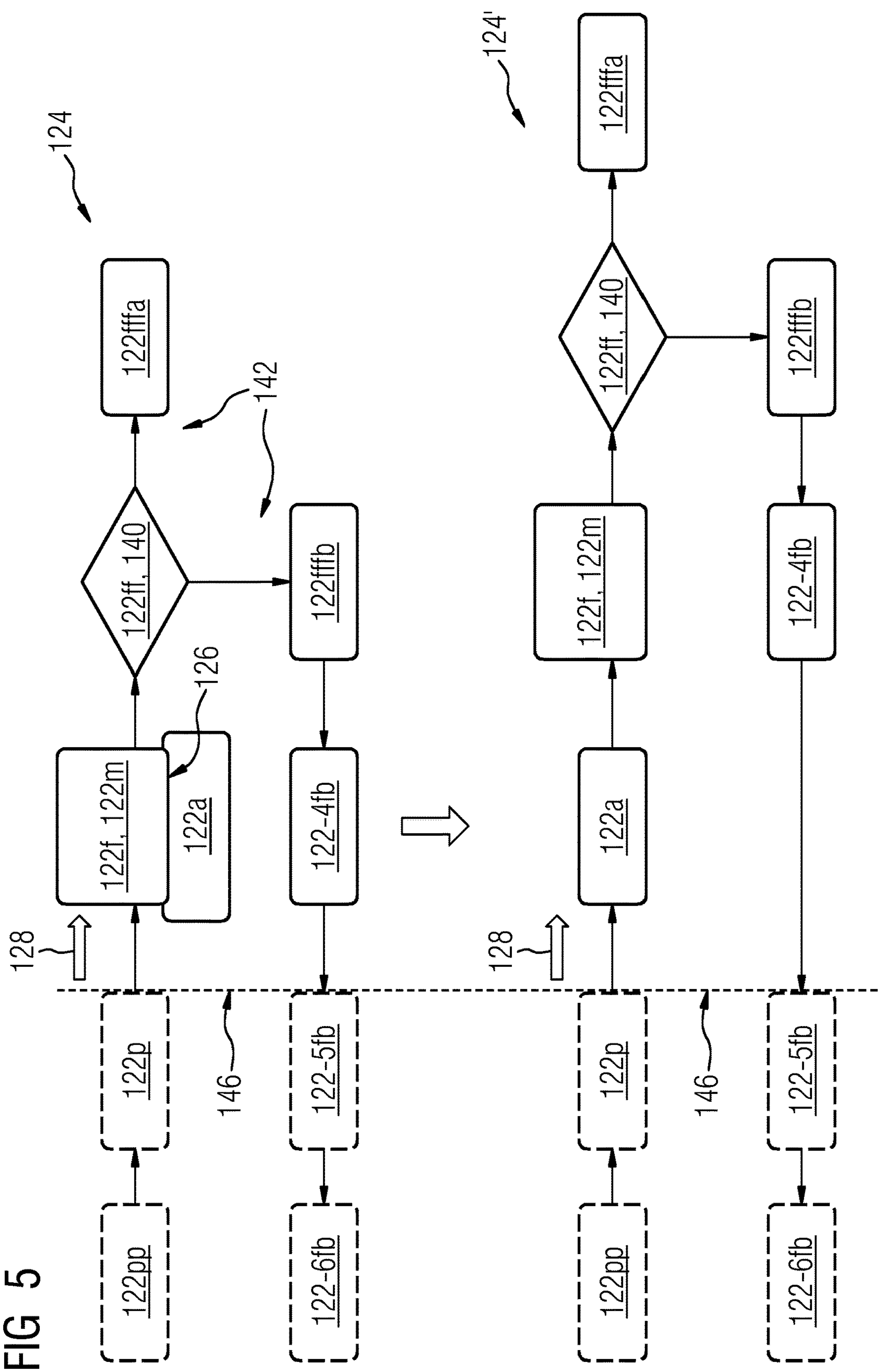

In some examples, the workflow 124 may intersect the determined moving borderline 146 at least twice. The workflow 124 may include an S-shape or a Z-shape, as explained above, or the workflow 124 may include a U-shape as depicted in FIG. 5 and explained below.

In further examples, the application software component 106 and/or the processor 102 may further be configured to determine at least one position 130 in the workflow 124 at which to insert the additional workflow artifact 122*a* using the captured user's intent and a trained function 132.

A trained function 132 may, e.g., be understood to be or include a machine learning algorithm, a deep learning model, an artificial neural network or more generally an artificial intelligence-based function. Alternative terms for "artificial neural network" are "neural network", "artificial neural net" or "neural net" and an example may be a convolutional neural network.

The trained function 132 may receive data input that is then processed using the trained function 132 to generate data output. in some examples, the trained function 132 may be used for pattern recognition, data mining, image recognition, speech recognition, etc., and may be useful for processing large amounts of data.

In the present context, the trained function 132 may, in some examples, include a recommendation engine that may make a recommendation or several recommendations to the user with respect to a position 130 or several different positions 130 in the workflow at which to insert the additional workflow artifact 122*a* into the workflow 124. Herein, the mentioned data input may include data on one or more meaningful positions 130 for inserting respective additional workflow artifacts 122*a* into workflows 124. The data input may, in some examples, originate from users that have previously amended their respective workflow 124 by inserting additional workflow artifacts 122*a* to create or develop respective apps 120. In some examples, only such input data may be considered in which the amended workflow 124' resulted in a successfully developed and deployed app 120. The trained function 132 may use such data input, process the data input, and then output data output including one or more recommended positions 130 at which the user of the currently developed workflow 124 and app 120 may insert the currently inserted workflow artifact 122*a*.

In other examples, the user may initially only provide a certain desired functionality of the app 120 and the trained function 132 may then determine the additional workflow artifact 122*a* that needs to be inserted into the workflow 124 and that corresponds best to the functionality desired by the user. In such more advanced examples, the trained function 132 may therefore sort of translate the captured user's intent to insert the desired functionality into the required additional workflow artifact 122*a*. Herein, the corresponding data input may, in some examples, originate from users that have previously input a desired functionality and inserted additional workflow items 122*a* into the workflow to (successfully) create or develop respective apps 120.

The suggested update mechanism of the workflow 124 after the insertion of the additional workflow item 122*a* may support both a regular, non-expert app developer user and a user who is supported by the trained function 132. In some examples, the trained function 132 may very quickly and conveniently determine the suitable position 130 at which the additional workflow artifact 122*a* shall be inserted. However, in many cases, the trained function 132 or some other artificial intelligence-based function may not be able to update the workflow 124 in a meaningful way. Hence, the trained function 132 may be limited to only determine the right position 130 for the insertion of the additional workflow artifact 122*a* but may not carry out the subsequent step of suitably updating, rearranging or reordering the workflow 124 after the insertion of the additional workflow artifact 122*a*. In many examples, a workflow 124 established only by regular, non-expert app developer users supported by the trained function 132 or some other artificial intelligence-based function but without the suggested update mechanism of the workflow 124 might include inconsistencies or conflicts that might cause severe issues for the app development platform 118 when developing a corresponding app 120. Also, in many cases, the trained function 132 without suggested update mechanism of the workflow 124 might lead to a messed-up and confusing workflow 124 that might be very hard for both a user and the app development platform 118 to interpreted in a meaningful way.

In some examples, the application software component 106 and/or the processor 102 may further be configured to display the respective, determined position 130 to the user in the app development UI 116 and to capture the user's intent to approve at least one of the respective, determined position 130 in response to user interactions with the app development UI 116.

Displaying the respective, determined position 130 to the user and getting the user's approval to at least one of the respective, determine position(s) 130 may, in some examples, help to train and refine the trained function 132. Over time, the trained function will improve its accuracy so that the likelihood that a determined position 130 fits well and is approved by the user is getting greater and greater.

In further examples, the application software component 106 and/or the processor 102 may further be configured to move the workflow artifacts 122 of the workflow 124 following the inserted artifact 122*a* along the determined flow direction 128 at least until the determined overlap 126 is removed.

In such examples, (all) the workflow artifacts 122 following the inserted artifact 122*a* may be moved along the determined flow direction 128 at least until the determined overlap 126 is removed. The moved workflow artifacts 122 may include the following workflow artifact 122*f*, i.e., the workflow artifact 122*f* that follows the inserted artifact 122*a*. This approach of updating the workflow 124 is simple and easy to implement, but nonetheless results in a well-arranged updated workflow 124'. Such scenarios may be suitable for rather simple and linear workflows 124, e.g., in which the workflow artifacts 122 following the inserted artifact 122*a* are more or less arranged along one line, e.g., the determined flow direction 128.

in some examples, the application software component 106 and/or the processor 102 may further be configured to determine the overlap 126 of at least two of the workflow artifacts 122 caused by a previously moved workflow artifact 122*m*; to determine the flow direction 128 of the workflow 124 from the preceding workflow artifact 122*p* to the following workflow artifact 122*f*, the preceding workflow artifact 122*p* and the following workflow artifact 122*f* preceding and following the previously moved workflow artifact 122*m*, respectively; to determine at least one workflow artifact 122*mm* of the workflow 124 that needs to be moved along the determined flow direction 128 to avoid the determined overlap 126; and to determine the updated workflow 124' by moving the respective, determined workflow artifact 122*mm* along the determined flow direction 128 at least until the determined overlap 126 is removed.

In these examples, in the previous step, the previously determined workflow artifact 122*m* has already been moved, whereby the movement of this previously determined workflow artifact 122*m* may cause the current overlap 126. In this case, the previously described method may be applied again so that firstly, this new overlap 126 may be determined, secondly, the new flow direction 128 of the present workflow 124 may be determined, whereby the present workflow 124 corresponds to the previously updated workflow 124' taking into account the movement of the previously moved workflow artifact 122*m*. The new flow direction 128 takes into account the workflow artifact 122*p* preceding the previously moved artifact 122*m* and the workflow artifact 122*f* following the previously moved artifact 122*m*. Thirdly, at least one workflow artifact 122*mm* may be determined that needs to be moved to avoid the determined current overlap 126, and fourthly, the current workflow 124 may be updated to obtain an amended updated workflow 124' by moving the respective determined workflow artifact 122*mm* along the determined new flow direction 128 at least until the determined overlap 126 is removed.

In this way, an overlap 126 that has previously been caused by moving a workflow artifact 122 to remove a previously existing overlap 126 may be removed. This procedure may be iterated, i.e., repeated again and again, until all iteratively caused overlaps 126 in the workflow 124 may be removed.

In some examples, the application software component 106 and/or the processor 102 may further be configured to capture the user's intent to remove a selected workflow artifact 122*r* from the workflow 124 in response to user interactions with the app development UI 116; to remove the selected workflow artifact 122*r* from the workflow 124 according to the captured user's intent; to determine a gap 134 between the preceding workflow artifact 122*p* and the following workflow artifact 122*f*, the preceding workflow artifact 122*p* and the following workflow artifact 122*f* preceding and following the removed workflow artifact 122*r*, respectively; to determine the flow direction 128 of the workflow 124 from the preceding workflow artifact 122*p* to the following workflow artifact 122*f*; and to determine the updated workflow 124' by moving the following workflow artifact 122*f* in opposite direction to the determined flow direction 128 until the determined gap 134 is closed.

Removing one of the workflow artifacts 122 may lead to a gap 134 between the artifacts 122*p*, 122*f* preceding and following the removed workflow artifact 122*r*. Herein, a gap 134 may, in some examples, be understood as too much space between two neighboring workflow artifacts 122 of the workflow 124, e.g., such that, e.g., an additional workflow artifact 122*a* might be inserted in the gap 134 without causing an overlap 126. Such gaps 134 may be avoided to maintain a well-organized workflow 124 that, by way of example, also allows for easier readability to the user.

After determining the flow direction 128 of the workflow 124 from the preceding workflow artifact 122*p* to the following workflow artifact 122*f*, the updated workflow 124' may be obtained by moving the following workflow artifact 122*f* in opposite direction to the determined flow direction 128 until the gap 134 is closed. The opposite direction may hereby mean that the direction of movement of the following workflow artifact 122*f* is exactly opposed or rotated by 180° with respect to the determined flow direction 128.

In some examples, (all) the workflow artifacts 122 following the removed workflow artifact 122*r* or following the following workflow artifact 122*f* may be moved in opposite direction to the determined flow direction 128. This approach of updating the workflow 124 is simple and easy to implement, but nonetheless results in a well-arranged updated workflow 124'. Such scenarios may be suitable for rather simple and linear workflows 124, e.g., in which the workflow artifacts 122 following the removed artifact 122*r* are more or less arranged along one line, e.g., the determined flow direction 128.

In some examples, the user intent may be to move one of the workflow artifacts 122 from an initial position to a final position within the workflow 124. This user intent may be understood as deleting this specific workflow artifact 122 at the initial position and inserting the specific workflow artifact 122 at the final position in the workflow 124. Herein, the removal of this specific workflow artifact 122 at the initial position in the workflow 124 may be understood as removing this specific workflow artifact 122 as the selected workflow artifact 122*r* from the workflow 124 at the initial position. The resulting gap 134 at the initial position may then be closed according to the approach described above.

In some examples, the inserted workflow artifact 122*a* may be inserted into a loop 136 of workflow artifacts 122. The loop 136 may have a loop size 138 and a loop border 139. The application software component 106 and/or the processor 102 may further be configured to determine an overlap 126 of a workflow artifact 122 included by the loop 136 and the loop border 139, the overlap 126 being caused by the workflow artifact 122*a* inserted into the loop 136; and to determine the updated workflow 124' by expanding the loop size 138 of the loop 136 along the determined flow direction 128 at least until the determined overlap 126 is removed.

Herein, a loop 136 may be used to execute repeated actions including one or more workflow artifacts 122 may be visualized as a frame. For each iteration, the flow inside the loop 136 may be executed. In some examples, the loop 136 may be configured to iterate over a list or be based on a Boolean expression. The iteration over the list may include executing the workflow artifacts 122 of the loop 136 for each of the entries of the list. The iteration based on the Boolean expression may include executing the workflow artifacts 122 of the loop 136, e.g., while a condition is true. In some examples, the loop 136 may contain all types of workflow artifacts 122, e.g., also used in microflows or nanoflow, except for start events and end events that start or end the workflow 124. Further, a loop 136 may contain workflow artifacts 122 corresponding to break events and continue events.

In order to accommodate the workflow artifacts 122 included by the loop 136, the loop 136 may have a certain loop size 138 and may be limited by a loop border 139 that may both be displayed in the app development UI 116 as a frame of a corresponding size.

If the inserted workflow artifact 122*a* is inserted into the loop 136, an overlap 126 of at least one of the workflow artifact 122 of the loop 136 and the loop border 139 may occur. First, this overlap 126 may be determined and then, an updated workflow 124 may be determined by expanding the loop size 138 and hence of the loop border 139 of the loop 136 along the determined flow direction 128 at least until the determined overlap 126 is removed. Herein, the flow direction 128 may be determined from the workflow artifact 122*p* preceding the inserted workflow artifact 122*a* to the workflow artifact 122*f* following the inserted workflow artifact 122*a*. Expanding the loop size 138 along the determined flow direction may, in some examples, mean that the start or entry point of the loop 136 in the workflow 124 remains unchanged, whereas the endpoint or exit point of the loop 136 in the workflow 124 may be moved along the determined flow direction 128 thereby expanding or enlarging the loop size 138 and the loop border 139 until the determined overlap 126 is removed. In some examples, expanding the loop size 138 may involve expanding the loop border 139 along the determined flow direction 128 accordingly.

By way of example, the application software component 106 and/or the processor 102 may further be configured to determine an overlap 126 of the expanded loop 136 and the workflow artifact 122*lf* following the loop 136; to determine the flow direction 128 of the workflow 124 from the expanded loop 136 to the workflow artifact 122*lf* following the loop 136; and to determine the updated workflow 124' by moving the workflow artifact 122*lf* following the loop 136 along the determined flow direction 128 at least until the determined overlap 126 is removed.

In this example, in the previous step, the loop size 138 has already been expanded to remove a previously existing overlap 126 between a workflow artifact 122 included by the loop 136 and the loop border 139, whereby the expansion of the loop size 138 causes the current overlap 126. In this case, a new overlap 126 may be determined, whereby now the expanded loop 136 with its expanded loop border 139 and the workflow artifact 122*lf* following expanded loop 136 may overlap. Then, the flow direction 128 may be determined that now takes into account these two items, namely the expanded loop border 139 and the workflow artifact 122*lf* following expanded loop 136. Finally, the updated workflow 124' may be determined by moving the workflow artifact 122*lf* following expanded loop 136 along the determined flow direction 128 at least until the determined overlap 126 is removed.

In this way, an overlap 126 that has previously been caused by expanding the loop 136 may be removed.

In some examples, the preceding workflow artifact 122*p* may be a split artifact 140 starting partial flows 142 of the workflow 124. The application software component 106 and/or the processor 102 may further be configured to determine the flow direction 128 of the workflow 124 from the following workflow artifact 122*f* to the workflow artifact 122*ff* following the following workflow artifact 122*f*; and to determine the updated workflow 124' by arranging the inserted artifact 122*a* at an initial position 144 of the following artifact 122*f* and by moving the following workflow artifact 122*f* along the determined flow direction 128 at least until the determined overlap 126 is removed.

In these examples, preserving the layout of the workflow 124 may be challenging. To meet this challenge, the flow direction 128 of the workflow 124 is determined by considering the workflow artifact 122*f* following the inserted workflow artifact 122*a* and the workflow artifact 122*ff* following the workflow artifact 122*f* following the inserted workflow artifact 122*a*. In other words, the determination of the flow direction 128 is postponed or relocated by one couple of workflow artifacts 122 from the couple of workflow artifacts 122*p*-122*f* to the couple of workflow artifacts 122*f*-122*ff*.

The updated workflow 124' may then be determined by arranging the inserted artifact 122*a* at the initial position 144 or 130 at which the following artifact 122*f* was initially positioned. This following workflow artifact 122*f* may then be moved along the determined flow direction 128 at least until the determined overlap 126 is removed. In some examples, the determined overlap 126 relate to an overlap 126 of at least two of the workflow artifacts 122 caused by the inserted workflow artifact 122*a*. In many cases, the inserted workflow artifact 122*a* and the following workflow artifact 122*f* may overlap.

The mentioned split artifact 140 may, by way of example, correspond to the decision workflow artifacts 122 explained above.

In further examples, the following workflow artifact 122*f* may be a merge artifact 148 merging partial flows 142 of the workflow 124. The application software component 106 and/or the processor 102 may further be configured to determine the flow direction 128 of the workflow 124 from the workflow artifact 122*pp* preceding the preceding workflow artifact 122*p* to the preceding workflow artifact 122*p*; and to determine the updated workflow 124' by moving the preceding workflow artifact 122*p* in the opposite direction to the determined flow direction 128 at least until the determined overlap 126 is removed.

Also in these examples, preserving the layout of the workflow 124 may be challenging. To meet the challenge, the updated workflow 124' may be determined by moving the preceding workflow artifact 122*p* in the opposite direction to the determined flow direction 128 at least until the determined overlap 126 is removed. Again, the opposite direction may hereby mean that the direction of movement of the preceding workflow artifact 122*p* is exactly opposed or rotated by 180° with respect to the determined flow direction 128. Herein, the preceding workflow artifact 122*p* may be the workflow artifact 122*p* that precedes the inserted workflow artifact 122*a* and the workflow artifact 122*pp* may precede the preceding workflow artifact 122*p*. In some examples, all the workflow artifacts 122*p* preceding the inserted workflow artifact 122*a* may be moved in the opposite direction to the determined flow direction 128 at least until the determined overlap 126 is removed.

In some examples, the updated workflow 124' may further be determined by arranging the inserted artifact 122*a* at the initial position 144 or 130 at which the preceding artifact 122*p* was initially positioned.

The mentioned merge artifact 148 may, by way of example, correspond to the merge workflow artifacts 122 explained above.

in some examples, the application software component 106 and/or the processor 102 may further be configured to determine a moving borderline 146 in the workflow 124. The moving borderline 146 intersects the preceding workflow artifact 122*p* and is perpendicular to the determined flow direction 128; and to determine an updated workflow 124' by only moving one or more workflow artifacts 122 that are arranged in the workflow 124 at the same side of the moving borderline 146 as the inserted artifact 122*a* or the removed workflow artifact 122*r*.

The use of the described moving borderline 146 may be advantageous for more complex or advanced workflows 124. Such more complex workflows 124 may include curves at which workflow artifacts 122 may be arranged so that the workflow 124 may cross or intersect the determined moving borderline 146 once or several times. Imagine, for example, a workflow 124 with an S-shape or a Z-shape. The moving borderline may be a vertical line that splits this workflow

124 into the right half and the left half. It is obvious that such a workflow 124 crosses or intersect this moving borderline 146 three times, namely at the top, at the middle and at the bottom of the shape of the workflow 124.

The moving borderline 146 may be determined to intersect the workflow 124 at the preceding workflow artifact 122*p* and may be perpendicular to the determined flow direction 128. The updated workflow 124' may then be determined by only moving artifacts 122 that are arranged at the same side of the moving borderline 146 as the inserted workflow artifact 122*a* or the removed workflow artifact 122*r*. In other words, in some examples, workflow artifacts that are arranged at the same side of the moving borderline 146 as the preceding workflow artifact 122*p* may not be moved.

This rather simple approach may turn out to be very efficient and failsafe. It is rather easy to implement and yet considerably contributes to preserve the layout of the workflow 124.

In further examples, the application software component 106 and/or the processor 102 may further be configured to deploy the developed app 120 including the updated workflow 124' on a respective target device 150 of the app 120.

The (type of) target device 150 may, e.g., be a mobile platform, e.g. a smartphone, smartwatch, handheld, pad, laptop or the like, or a desktop device, e.g. including desktop computers, or other "smart" devices, e.g. smart television sets, fridges, home, or industrial automation devices. Smart television sets may e.g. be a television set with integrated Internet capabilities or a set-top box for television that offers more advanced computing ability and connectivity than a contemporary basic television set. The different kinds of platforms may involve different operating systems, e.g., linux, unix, iOS, macOS, Microsoft Windows or the like. the user ("app developer") developing the app 150 may be (and generally is) a different person than the user ("app customer", "customer user" or "end user") using or running the app 120 deployed on their target device 150.

Further, by way of example, the respective target device 150 may be or include a manufacturing operation management (MOM) system, a manufacturing execution system (MES), and enterprise resource planning (ERP) system, a supervisory control, and data acquisition (SCADA) system, or any combination thereof.

By way of example, the app 120 may be deployed in the runtime of the respective target device 150. Herein, the runtime of the respective target device 150 may be understood as runtime system, also called runtime environment, primarily implementing portions of an execution model. When treating the runtime system as distinct from the runtime environment (RTE), the first may be defined as a specific part of the application software (IDE) used for programming, a piece of software that provides the programmer a more convenient environment for running programs during their production (testing and similar) while the second (RTE) might be the very instance of an execution model being applied to the developed program that is itself then run in the aforementioned runtime system. The runtime environment may provide an environment in which programs, here the app 120, run. This environment may address a number of issues including the management of application memory, how the program or the app 120 accesses variables, mechanisms for passing parameters between procedures, interfacing with the operating system, and otherwise. Typically, the runtime system will have some responsibility for setting up and managing the stack and heap, and may include features such as garbage collection, threads or other dynamic features built into the language.

Further, an app 120 may be understood as deployed if the activities that are required to make this app 120 available for use by the app user on the respective target device 150 are completed. The app deployment process may include several interrelated activities with possible transitions between them. These activities may occur at the producer side (e.g., by the app developer) or at the consumer side (by the app user or end user) or both. In some examples, the app deployment process may include at least the release of the app 120 and the installation and the activation of the app 120. The release activity may follow from the completed development process and is sometimes classified as part of the development process rather than deployment process. It may include operations required to prepare a system (here: e.g., the app development platform 118 or an on-line app store) for assembly and transfer to the computer system(s) (here: e.g., the respective target device 150) on which it will be run in production. Therefore, it may sometimes involve determining the resources required for the system to operate with tolerable performance and planning and/or documenting subsequent activities of the deployment process. For simple systems, the installation of the app 120 may involve establishing some form of command, shortcut, script, or service for executing the software (manually or automatically) of the app 120. For complex systems, it may involve configuration of the system-possibly by asking the end user questions about the intended app use, or directly asking them how they might like it to be configured—and/or making all the required subsystems ready to use. Activation may be the activity of starting up the executable component of software or the app 120 for the first time (that is not to be confused with the common use of the term activation concerning a software license, that is a function of Digital Rights Management systems).

Once the app 120 has been deployed on the respective target device 150 or in the runtime of the respective target device 150, the app 120 may be run or operated.

By way of example, the application software component 106 and/or the processor 102 may further be configured to cause to apply the updated workflow 124' of the developed app 120 to input data 152 to generate output data 154; and to cause to analyze, monitor, operate and/or control the respective target device 150, or a device connected to the respective target device 150 using the generated output data 154 and/or to cause to analyze and/or monitor the respective target device's 150 user using the generated output data 154.

Once the app 120 has been deployed on the target device 150 or in the runtime of the target device 150, the app 120 may be run or operated that may imply that the amended workflow 124' of the app 120 may be put into action on (live) input data 152 to produce (actionable) output data 154.

By way of example, the respective target device 150 may not be connected to the app development platform 118 or to the internet, e.g., when or after the deployment of the developed app 120 on the respective target device 150 of the app 120. Further, in some examples, the respective target device 150 may not be connected to the app development platform 118 or to the internet when or after the amended workflow 124' of the developed app 120 is applied to the input data 132.

In some examples, the target device 150 may include or be the app development platform 118.

In an example embodiment, the app 120 may be deployed on a respective target device 150. In some examples, the respective target device 150 may be physically connected or communicatively connected to the other device or connected such, that the respective target device 150 may at least detect the input data 152 from the other device, e.g., by optically inspecting the other device. The other device may, in some examples, be or include a sensor, an actuator, such as an electric motor, a valve or a robot, an inverter supplying an electric motor, a gear box, a programmable logic controller (PLC), a communication gateway, and/or other parts or components relating to industrial automation products and industrial automation in general. The respective target device 150 may be part of a complex production line or production plant, e.g., a bottle filing machine, conveyor, welding machine, welding robot, etc.

In some examples, if the other device belongs to a lower level of the automation pyramid, such as the sensor/actuator or the field level, then the respective target device 150 may belong to a higher level of the automation pyramid, such as field level or the control level.

In this context, the respective target device 150 may be caused or triggered, e.g., by the app development platform 118, to apply the amended workflow 124' to the input data 152 to generate the output data 154. The generated output data 154 may be used to analyze, monitor, operate and/or control the respective target device 150 or the other device. In further examples, the respective target device 150 may be caused or triggered, e.g., by the app development platform 118, to analyze, monitor, operate and/or control the respective target device 150 or the other device using the generated output data 154. In some examples, the mentioned steps may directly be performed by the app development platform 118.

In further examples, the respective target device 150 may also be caused or triggered, e.g., by the app development platform 118, to apply the updated workflow 124' to the input data 152 to generate the output data 154. The generated output data 154 may be used to analyze and/monitor the respective target device's 150 user. In further examples, the respective target device 150 may be caused or triggered, e.g., by the app development platform 118, to analyze and/monitor the respective target device's 150 user using the generated output data 154. In such more exotic examples, the respective target device 150 may be or include a smartphone, smartwatch, handheld, pad, laptop or the like and the other device may be a human, e.g., the end user of the respective target device 150, or an animal or plant. The human's, the animal's or the plant's health, behavior, etc. may be analyzed or monitored using the amended workflow 124' and the app 120. In some examples, the mentioned steps may directly be performed by the app development platform 118.

In further examples, only new overlaps 126 may be detected and in some examples, old overlaps that existed previously may not be considered or tried to be resolved.

By way of example, the following rule set may be applied, whereby objects may be understood as the above-mentioned workflow artifacts 122:

Rule 1: If the new object overlaps with objects (indirectly) connected to the preceding object, then we should move the new object. This rule may avoid distorting the layout of the workflow 124.

Exception: Allow moving overlapped connected objects, if their direction is the same as the nudging or moving direction, and they are that side of the new object.

Rule 2: if the overlapped objects are not connected to preceding objects, then move those instead of moving the new object.

Rule 3: If the new object overlaps objects that are not connected to preceding objects, that are far side of origin, then move the new object.

The rules may be run in the above order.

As explained above, moving one the workflow artifacts 122 may result in new overlaps 126 that should also be resolved.

Preceding objects should, in most examples, not be moved.

The described the application software component 106 and/or the processor 102 may carry out an analogous method of managing an app 120, for example developing an app 120 including updating a workflow 124 of the app 120.

Further, a computer-readable medium 160 that may include a computer program product 162 is shown in FIG. 1. The computer program product 162 may be encoded with executable instructions, that when executed, cause the computer system 100 or and/or the app development platform 118 to carry out the described method.

For the sake of completeness, the two app development UIs 116 depicted in FIG. 1 are briefly explained. In the upper app development UI 116, the insertion of the additional workflow artifact **122*a* in the workflow 124 is depicted. The workflow 124 may already include the preceding workflow artifact 122*p* and the following workflow artifact 122*f*. An overlap 126 of the inserted workflow artifact 122*a* and the following workflow artifact 122*f* may be determined that may be caused by the insertion of the additional workflow artifact 122*a*. Further, the flow direction 128 of the workflow 124 may be determined. The flow direction 128 may be directed from the preceding workflow artifact 122*p* to the following workflow artifact 122*f*. The following workflow artifact 122*f* may be determined to be the workflow artifact 122*m* that may be needed to be moved to remove the determined overlapped 126. The following workflow artifact 122*f* may need to be moved along the determined flow direction 128**, as indicated with the dashed arrow.

In the lower app development UI 116, the status of the workflow 124 after the insertion of the additional workflow artifact **122*a* is depicted. And updated workflow 124' may be obtained by moving the inserted workflow artifact 122*a* along the determined flow direction 128 until the overlapped 126 is removed. According to the updated workflow 124', the previous workflow artifact 122*p* may be followed by the inserted workflow artifact 122*a* that may be followed by the following workflow artifact 122*f***.

By way of example, the additional workflow artifact **122*a* may be put at the initial position of the following workflow artifact 122*f* or in the vicinity the initial position of the following workflow artifact 122*f*, e.g., towards the preceding workflow artifact 122*p*, to obtain the amended workflow 124'**.

Figure 2:
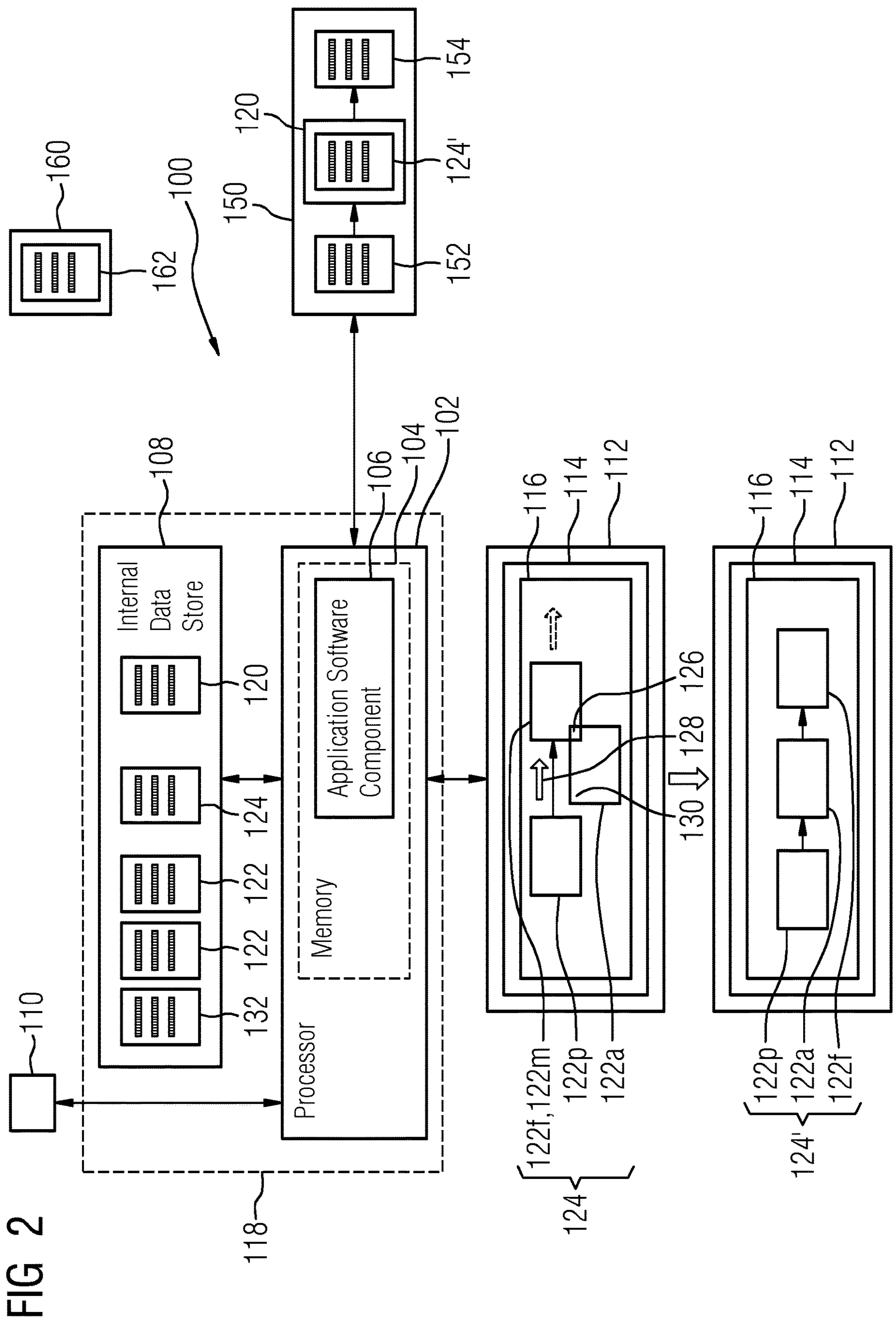

With reference to FIG. 2, a functional block diagram of another example computer system or data processing system 100 is depicted that facilitates managing apps 120, for example developing an app 120 including updating a workflow 124 of the app 120.

In this example, a position 130 in the workflow 124 may be determined at which to insert the additional workflow artifact **122*a* using the captured user's intent and a trained function 132. By way of example, the determined position 130 may displayed to a user and the user may approve the determined position 130 by their interactions with the app development UI 116**.

Further, the app 120 including the updated workflow 124' may be deployed on a target device 150. The updated workflow 124' of the developed and deployed app 120 may be applied to input data 152 to generate output data 154. By way of example, the input data 152 may be provided by the target device 150, the other device, a device connected to the target device 150 or the target device's user. In some examples, the generated output data 154 may be used to analyze, monitor, operate and/or control the target device 150 or the device connected to the target device 150. In other examples, the generated output data 154 more may be used to analyze and/or monitor the target device's user.

Figure 3:
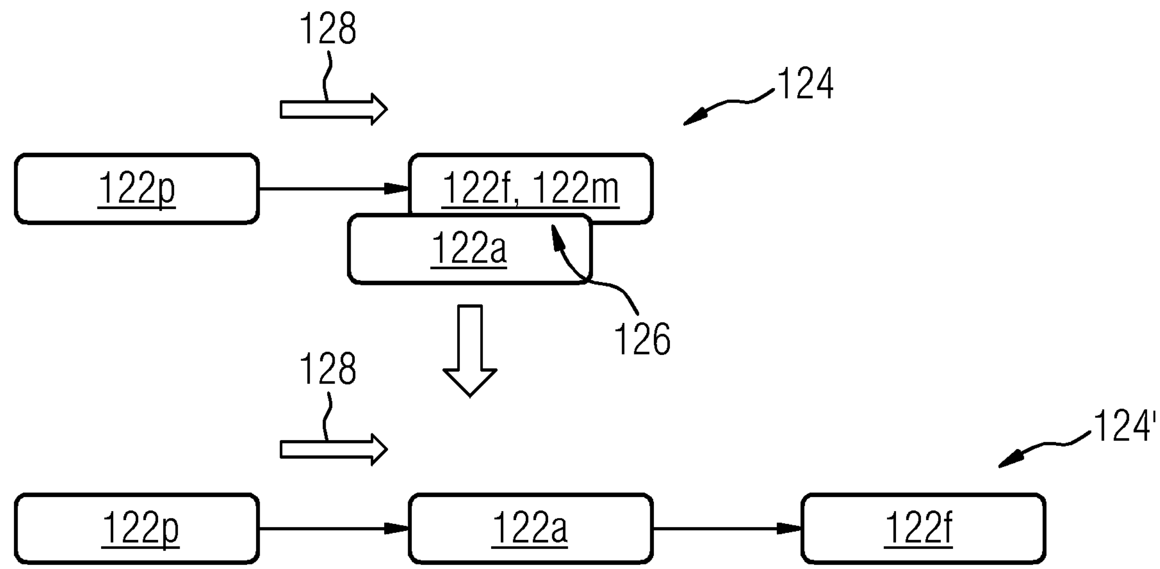
FIG. 3-10 depict a flow diagram of an example methodology that facilitates managing an app in a product system according to an embodiment.

FIG. 3 depicts a flow diagram of an example methodology that facilitates managing an app in a product system.

In the upper half of FIG. 3, a workflow 124 is depicted that may include a preceding workflow artifact 122*p* and a following workflow artifact 122*f*. A flow direction 128 of the workflow 124 may be determined to point from the preceding workflow artifact 122*p* to the following workflow artifact 122*f*. An additional workflow artifact 122*a* may be inserted into the workflow 124 and may cause an overlap 126 of the additional workflow artifact 122*a* with the following workflow artifact 122*f*. The overlap 126 may be determined and it may further be determined that the following workflow artifact 122*f* may be the workflow artifact 122*m* to be moved along the determined flow direction 128 to avoid the determined overlap 126.

The lower half of FIG. 3 depicts the updated workflow 124' that may be obtained by moving the determined workflow artifact 122*m* that is in this case the following workflow artifact 122*f* along the determined flow direction 128 at least until the determined overlapped 126 is removed. According to the updated workflow 124', the previous workflow artifact 122*p* may be followed by the inserted workflow artifact 122*a* that may be followed by the following workflow artifact 122*f*.

By way of example, the additional workflow artifact 122*a* may be put at the initial position of the following workflow artifact 122*f* or in the vicinity the initial position of the following workflow artifact 122*f*, e.g., towards the preceding workflow artifact 122*p*, to obtain the amended workflow 124'.

Figure 4:
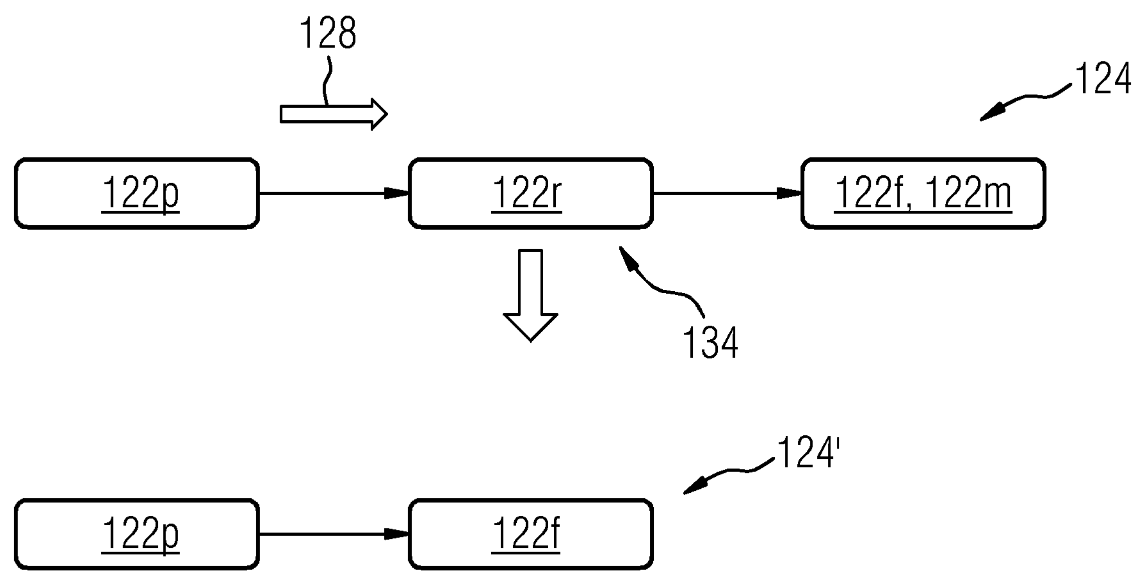

FIG. 4 depicts a flow diagram of another example methodology that facilitates managing an app in a product system.

In the upper half of FIG. 4, a workflow 124 is depicted that may include a preceding workflow artifact 122*p*, a workflow artifact 122*r*, and a following workflow artifact 122*f*. A flow direction 128 of the workflow 124 may be determined to point from the preceding workflow artifact 122*p* to the following workflow artifact 122*f*. The user may choose to remove the workflow artifact 122*r* that may cause a gap 134 between the preceding workflow artifact 122*p* and the following workflow artifact 122*f*.

The lower half of FIG. 4 depicts the updated workflow 124' that may be obtained by moving the following workflow artifact 122*f* (which is in this case the workflow artifact 122*m* to be moved) in the opposite direction to the determined flow direction 128 at least until the determined gap 134 is closed. According to the updated workflow 124', the previous workflow artifact 122*p* may be followed by the following workflow artifact 122*f*.

FIG. 5 depicts a flow diagram of a further example methodology that facilitates managing an app in a product system.

In the upper half of FIG. 5, a more complex workflow 124 is depicted that may include several sequentially arranged workflow artifacts 122*pp*, 122*p*, 122*f* and 122*ff*. The workflow artifact 122*ff* is a split artifact 140 starting two partial flows 142 of the workflow 124. The upper partial flow 142 only includes the workflow artifact 122*fffa* and the lower partial flow 142 includes another sequence of workflow artifacts 122*fffb*, 122-4*fb*, 122-5*fb*, 122-6*fb*. The workflow has a U-shape. The opening of the U points to the left.

An additional workflow artifact 122*a* may be inserted into the workflow 124 and may cause an overlap 126 of the additional workflow artifact 122*a* with the following workflow artifact 122*f*. The overlap 126 may be determined and it may further be determined that the following workflow artifact 122*f* may be the workflow artifact 122*m* to be moved along the determined flow direction 128 to avoid the determined overlap 126.

Further, a moving borderline 146 may be determined in the workflow 124. The moving borderline 146 intersects the preceding workflow artifact 122*p* and is perpendicular to the determined flow direction 128. Herein, the workflow artifacts 122*pp*, 122*p*, 122-5*fb*, and 122-6*fb* are arranged at the opposite site of the moving borderline 146 as the inserted workflow artifact 122*a*. In some examples, for updating the workflow 124 to obtain the updated workflow 124', only workflow artifacts 122 may be moved that are arranged in the workflow 124 at the same site of the moving borderline 146 as the inserted workflow artifact 122*a*.

The lower half of FIG. 5 depicts the updated workflow 124' that may be obtained accordingly, i.e., by moving only workflow artifacts 122 that are arranged in the workflow 124 at the same site of the moving borderline 146 as the inserted workflow artifact 122*a*, i.e., in this case the workflow artifacts 122*f*, 122*ff*, 140, 122*fffa*, 122*fffb*, 122-4*fb*. Accordingly, the workflow artifacts 122*pp*, 122*p*, 122-5*fb*, and 122-6*fb* may not be moved to obtain the updated workflow 124'.

By way of example, the additional workflow artifact 122*a* may be put at the initial position of the following workflow artifact 122*f* or in the vicinity the initial position of the following workflow artifact 122*f*, e.g., towards the preceding workflow artifact 122*p*, to obtain the amended workflow 124'.

Figure 6:
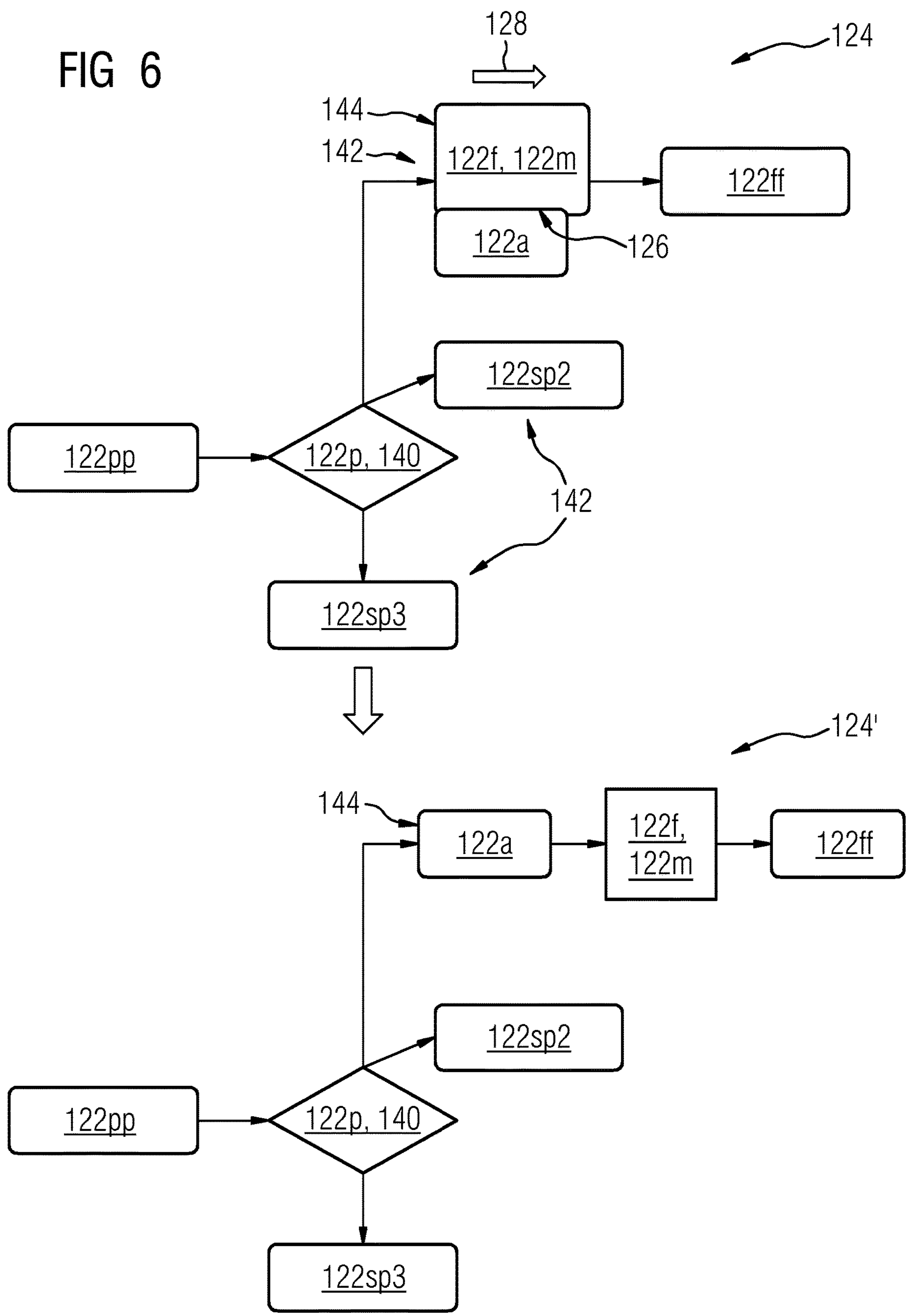

FIG. 6 depicts a flow diagram of another example methodology that facilitates managing an app in a product system.

In the upper half of FIG. 6, a more complex workflow 124 is depicted that may include a workflow artifact 122*pp* that is followed by a split artifact 122*p*, 140 that may start three partial flows 142. The upper partial flow 142 may include two sequentially arranged workflow artifacts 122*f* and 122*ff*. The middle partial flow 142 may only include one workflow artifact 122*sp*2, and the lower partial flow 142 may also only include one workflow artifact 122*sp*3.

An additional workflow artifact 122*a* may be inserted into the upper partial flow 142 of the workflow 124 and may cause an overlap 126 of the additional workflow artifact 122*a* with the following workflow artifact 122*f*. In this example, the flow direction 128 of the workflow 124 may be determined from the following workflow artifact 122*f* to the workflow artifact 122*ff* following the following workflow artifact 122*f*. The overlap 126 may be determined and it may further be determined that the following workflow artifact 122*f* may be the workflow artifact 122*m* to be moved along the determined flow direction 128 to avoid the determined overlap 126. Further, an updated workflow 124' may be determined by arranging the inserted artifact 122*a* at an initial position 144 of the following artifact 122*f* and by moving the following workflow artifact 122*f* along the determined flow direction 128 at least until the overlap 126 of the inserted workflow artifact 122*a* and the following workflow artifact 122*f* is removed.

The lower half of FIG. 6 depicts the updated workflow 124' that may be obtained by moving the following workflow artifact 122*f* along the determined flow direction 128 and then the workflow artifact 122*ff* following the following artifact 122*f*. Hence, the upper partial flow 142 now includes three sequentially arranged workflow artifacts 122*a*, 122*f* and 122*ff*. The layout of the original workflow 124 could be preserved.

Figure 7:
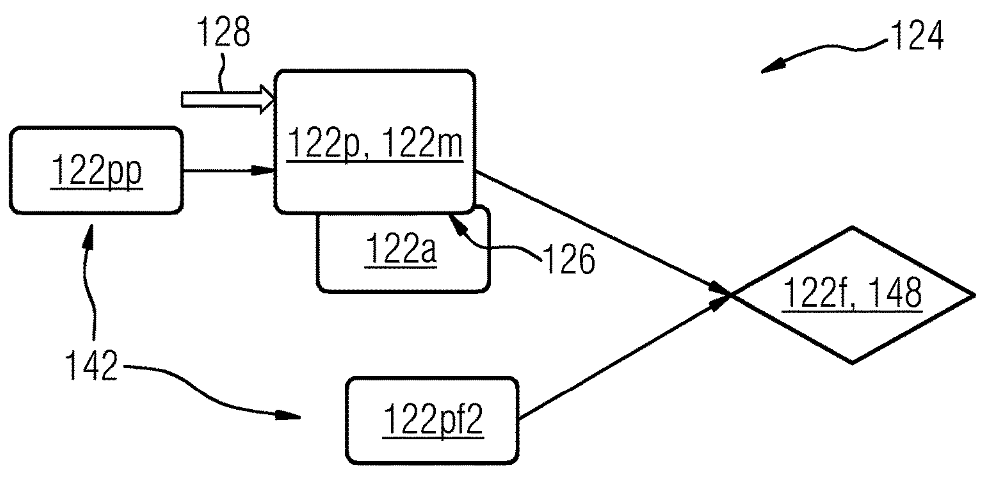
Figure 7:
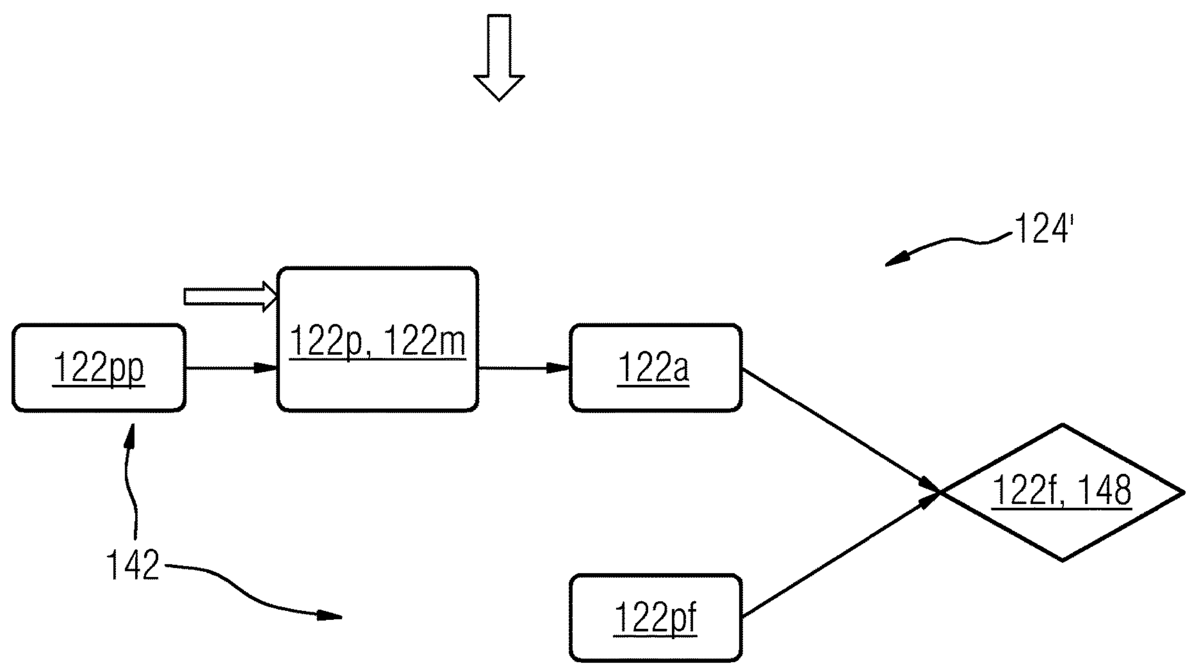

FIG. 7 depicts a flow diagram of yet another example methodology that facilitates managing an app in a product system.

In the upper half of FIG. 7, a workflow 124 is depicted that may include two partial flows 142. The upper partial flow 142 may include two sequentially arranged workflow artifacts 122*pp* and 122*p* and the lower upper partial flow 142 may include one workflow artifact 122*pf*2. The two partial flows 142 may be merged by the following workflow artifact 122*f* that is a merge artifact 148. An additional workflow artifact 122*a* may be inserted into the upper partial flow 142 of the workflow 124 and may cause an overlap 126 of the additional workflow artifact 122*a* with the previous workflow artifact 122*p*.

The flow direction 128 of the workflow 124 may be determined to point from the workflow artifact 122*pp* preceding the preceding workflow artifact 122*p* to the preceding workflow artifact 122*p*. The updated workflow 124' may then be obtained by moving the preceding workflow artifact 122*p* in the opposite direction to the determined flow direction 128 at least until the determined overlap 126 is removed.

The lower half of FIG. 7 depicts the updated workflow 124' that may be obtained by moving the previous workflow artifact 122*p* and the workflow artifact 122*p* that precedes the previous workflow artifact 122*p* accordingly. Hence, the upper partial flow 142 now includes three sequentially arranged workflow artifacts 122*pp*, 122*p* and 122*a*. The layout of the original workflow 124 could be preserved.

By way of example, the additional workflow artifact 122*a* may be put at the initial position of the preceding workflow artifact 122*p* or in the vicinity the initial position of the preceding workflow artifact 122*p*, e.g., towards the workflow artifact 122*pp* preceding the preceding workflow artifact 122*p*, to obtain the amended workflow 124'.

Figure 8:
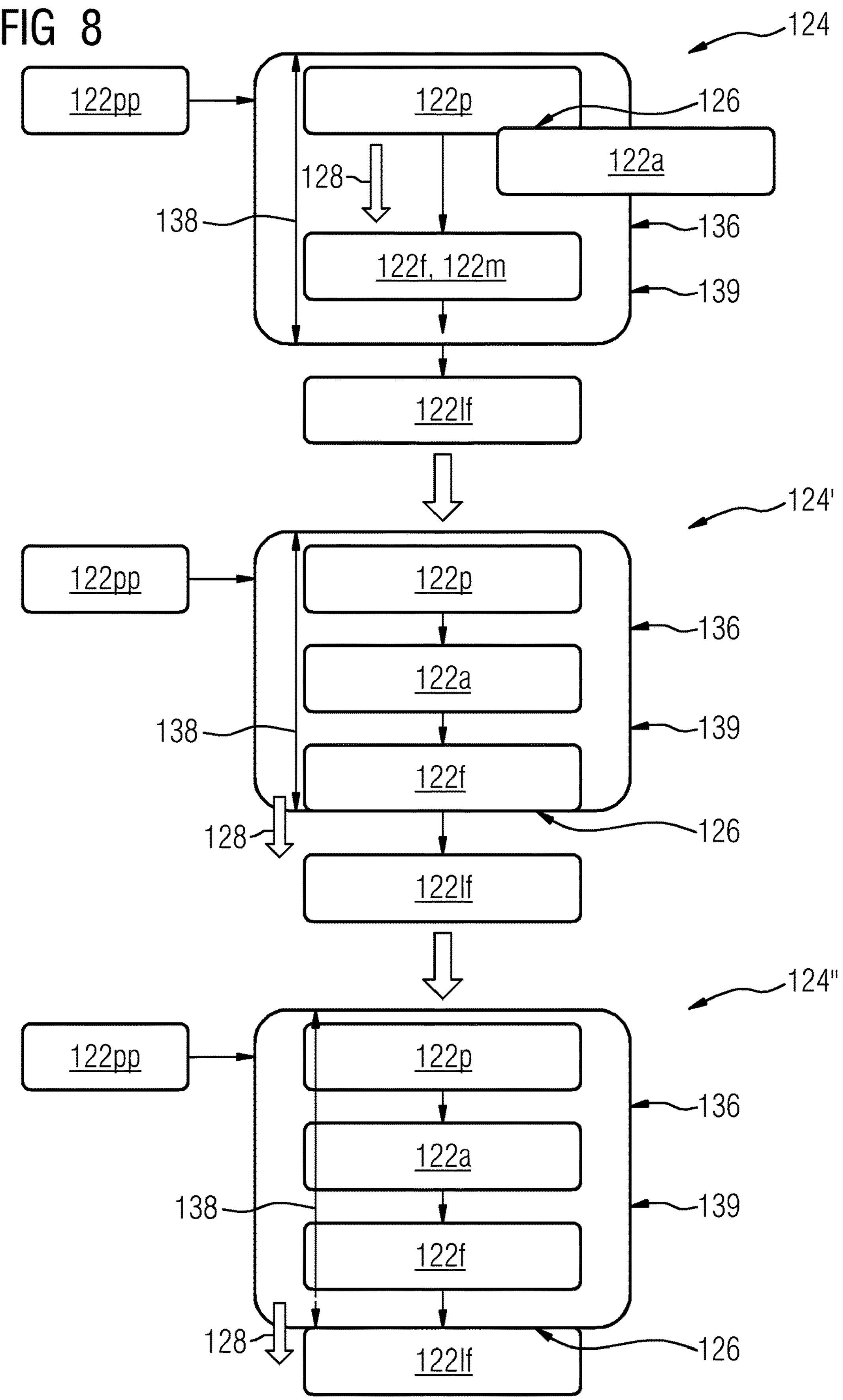

FIG. 8 depicts a flow diagram of another example methodology that facilitates managing an app in a product system.

In the upper third of FIG. 8, a workflow 124 is depicted that may include the first workflow artifact 122*pp* that may be followed by a loop 136 including to sequentially arranged workflow artifacts 122*p* and 122*f*. The loop 136 may be followed by a last workflow artifact 122*lf*. The loop may have loop size 138. An additional workflow artifact 122*a* may be inserted into the loop 136 that may cause an overlap of the inserted workflow artifact 122*a* with the previous workflow artifact 122*p*.

The flow direction 128 from the preceding workflow artifact 122*p* to the following workflow artifact 122*f* may be determined and updated workflow 122' may be determined by moving the following workflow artifact 122*f* (which may correspond to the workflow artifact 122*m* to be moved) along the determined flow direction 128 to avoid the determined overlap 126.

By way of example, the additional workflow artifact 122*a* may be put at the initial position of the preceding workflow artifact 122*f* or in the vicinity the initial position of the following workflow artifact 122*f*, e.g., towards the preceding workflow artifact 122*p*, to obtain the amended workflow 124'.

This updated workflow 124' is depicted in the center third of FIG. 8. The moved, following workflow artifact 122*f*, 122*m* that is included by the loop 136 now overlaps with the loop border 139. This overlap 126 may be determined as well as the flow direction 128 pointing from the following workflow artifact 122*f* to the workflow artifact 122*lf* following the loop 136. The updated workflow 124" may be obtained by expanding the loop size 138 along the determined flow direction 128 at least until the determined overlap 126 is removed. Herein, expanding the loop size 138 may involve expanding the loop border 139 along the determined flow direction 128 accordingly. The expansion of the loop 136, the loop size 138, and the loop border 139 is depicted in the lower third of FIG. 8 with the dashed arrow.

Figure 9:
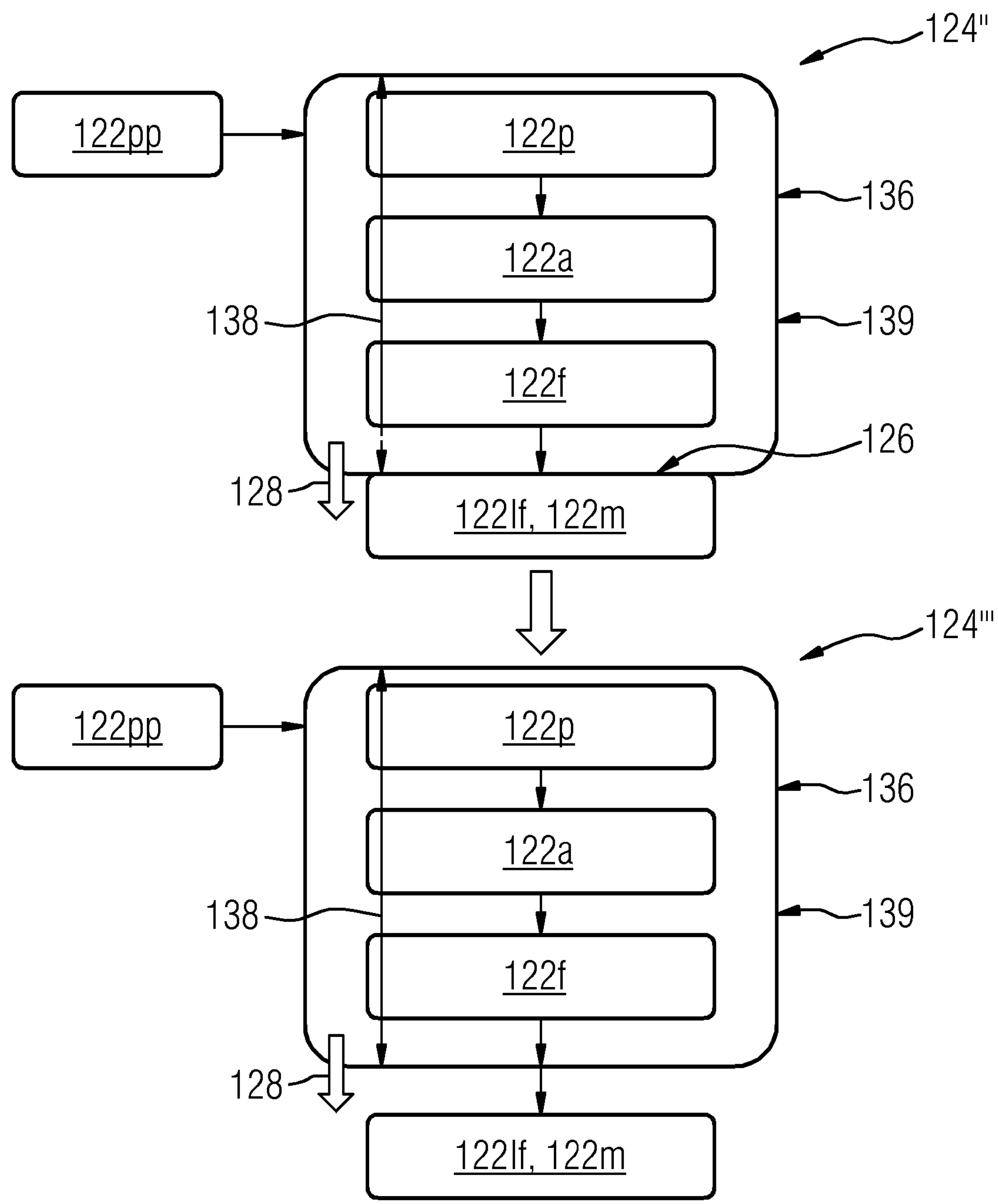

This updated workflow 124" is depicted in the lower third of FIG. 8 as well as in the upper half of FIG. 9.

FIG. 9 depicts a flow diagram of yet another example methodology that facilitates managing an app in a product system.

The upper half of FIG. 9 depicts the updated workflow 124" that may be obtained by the procedure depicted in FIG. 8 and described above. Expanding the loop size 138 and the loop border 139 may lead to an overlap 126 of the expanded loop border 139 and the workflow artifact 122*lf* following the loop 136. The flow direction 128 may be determined to point from the expanded loop 136 to the workflow artifact 122*lf* following the loop 136. Then, the updated workflow 124'" may be obtained by moving the workflow artifact 122*lf* (which may now be the workflow artifact 122*m* to be moved) following the loop 136 along the determined flow direction 128 at least until the determined overlap 126 is removed.

This updated workflow 124" is depicted in the lower half of FIG. 9.

Figure 10:
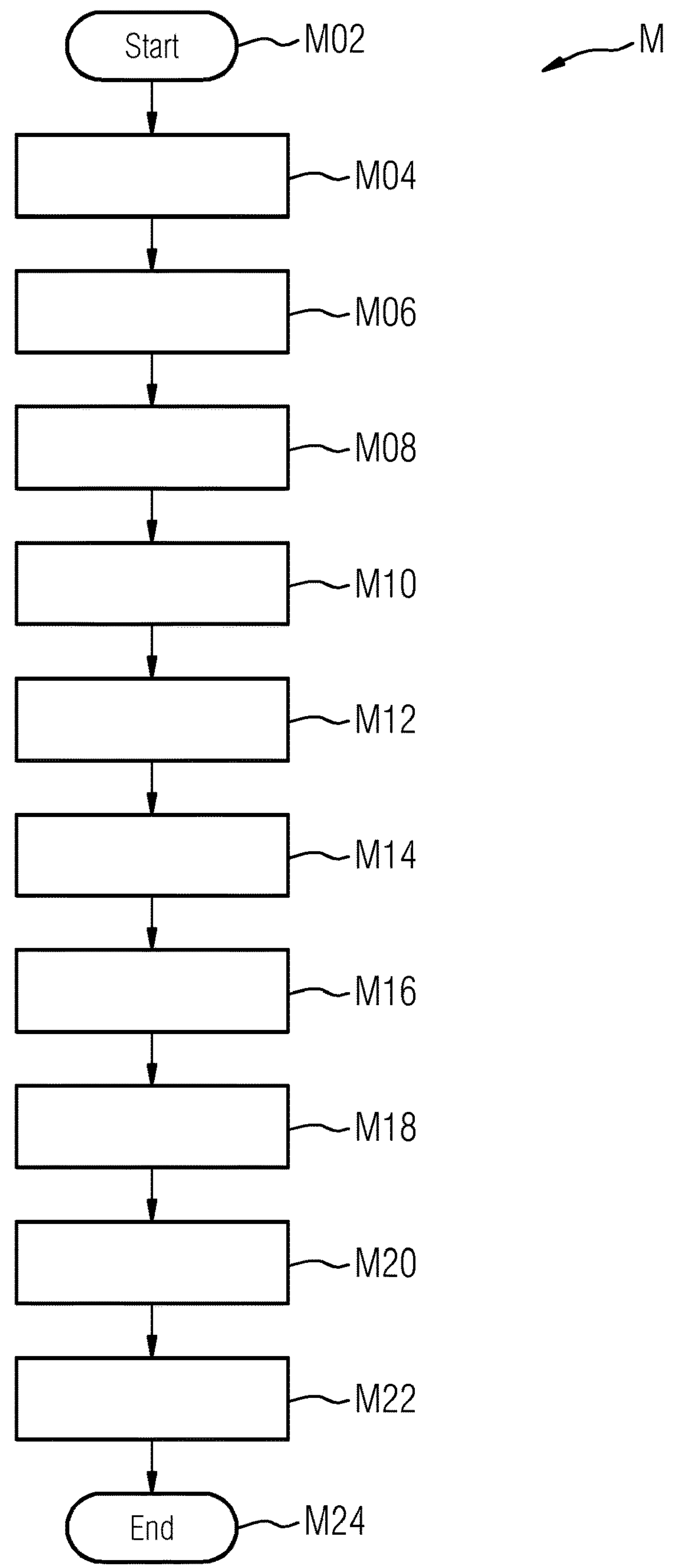

Referring now to FIG. 10, a methodology M that facilitates managing apps, such as developing an app including im-porting a trained function, is depicted. The method may start at M02 and the methodology may include several acts carried out through operation of at least one processor.

These acts may include an act M04 of providing an app development user interface (UI) to a user for developing the app; an act M06 of displaying at least two workflow artifacts of a workflow of the app to the user in the app development UI; an act M08 of capturing the user's intent to insert an additional workflow artifact into the workflow in response to user interactions with the app development UI; an act M10 of inserting the additional workflow artifact into the workflow according to the captured user's intent; an act M12 of determining an overlap of at least two of the workflow artifacts caused by the inserted workflow artifact; an act M14 of determining a flow direction of the workflow from the preceding workflow artifact to the following workflow artifact, the preceding and the following workflow artifact preceding and following the inserted workflow artifact, respectively; an act M16 of determining at least one workflow artifact of the workflow that needs to be moved along the determined flow direction to avoid the determined overlap; an act M18 of determining an updated workflow by moving the respective, determined workflow artifact in the direction of the determined flow direction at least until the determined overlap is removed; an act M20 of displaying at least the preceding workflow artifact, the inserted workflow artifact, and the following workflow artifact to the user in the app development UI; and an act M22 of developing the app through the app development UI by using the updated workflow. At M24 the methodology may end.

The methodology M may include other acts and features discussed previously with respect to the computer-implemented method of managing an app, for example developing an app including updating a workflow of the app.

Figure 11:
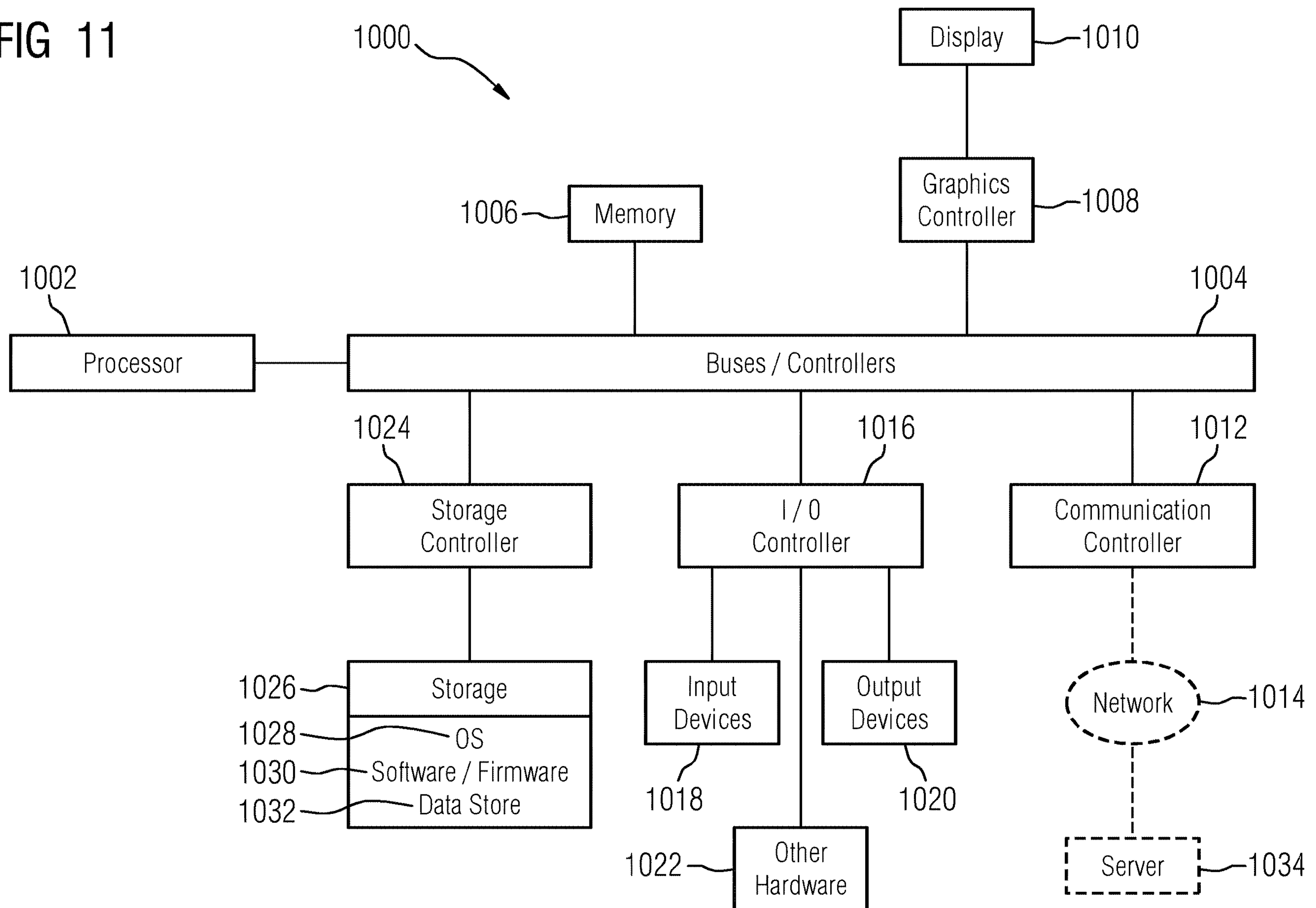
FIG. 11 depicts a block diagram of a data processing system in which an embodiment may be implemented.

FIG. 11 depicts a block diagram of a data processing system 1000 (also referred to as a computer system) in which an embodiment may be implemented, for example, as a portion of a product system, and/or other system operatively configured by software or otherwise to perform the processes as described herein. The data processing system 1000 may include, for example, the computer or IT system or data processing system 100 mentioned above. The data processing system depicted includes at least one processor 1002 (e.g., a CPU) that may be connected to one or more bridges/controllers/buses 1004 (e.g., a north bridge, a south bridge). One of the buses 1004, for example, may include one or more I/O buses such as a PCI Express bus. Also connected to various buses in the depicted example may include a main memory 1006 (RAM) and a graphics controller 1008. The graphics controller 1008 may be connected to one or more display devices 1010. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1012 (Ethernet controllers, WiFi controllers, cellular controllers) operative to connect to a local area network (LAN), Wide Area Network (WAN), a cellular network, and/or other wired or wireless networks 1014 or communication equipment.

Further components connected to various busses may include one or more I/O controllers 1016 such as USB controllers, Bluetooth controllers, and/or dedicated audio controllers (connected to speakers and/or microphones). various peripherals may be connected to the I/O controller(s) (via various ports and connections) including input devices 1018 (e.g., keyboard, mouse, pointer, touch screen, touch pad, drawing tablet, trackball, buttons, keypad, game controller, gamepad, camera, microphone, scanners, motion sensing devices that capture motion gestures), output devices 1020 (e.g., printers, speakers) or any other type of device that is operative to provide inputs to or receive outputs from the data processing system. Also, many devices referred to as input devices or output devices may both provide inputs and receive outputs of communications with the data processing system. For example, the processor 1002 may be integrated into a housing (such as a tablet) that includes a touch screen that serves as both an input and display device. Further, some input devices (such as a laptop) may include a plurality of different types of input devices (e.g., touch screen, touch pad, keyboard). Also, other peripheral hardware 1022 connected to the I/O controllers 1016 may include any type of device, machine, or component that is configured to communicate with a data processing system.

Additional components connected to various busses may include one or more storage controllers 1024 (e.g., SATA). A storage controller may be connected to a storage device 1026 such as one or more storage drives and/or any associated removable media, that may be any suitable non-transitory machine usable or machine-readable storage medium. Examples include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also, in some examples, a storage device such as an SSD may be connected directly to an I/O bus 1004 such as a PCI Express bus.

A data processing system in accordance with an embodiment of the present disclosure may include an operating system 1028, software/firmware 1030, and data stores 1032 (that may be stored on a storage device 1026 and/or the memory 1006). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, that is retrievable by a processor.

The communication controllers 1012 may be connected to the network 1014 (not a part of data processing system 1000), that may be any public or private data processing system network or combination of networks, as known to those of skill in the art, including the Internet. Data processing system 1000 may communicate over the network 1014 with one or more other data processing systems such as a server 1034 (also not part of the data processing system 1000). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system, or part thereof that controls at least one operation, whether such a device is implemented in hardware, firmware, software or some combination of at least two of the same. It should be noted that the functionality associated with any particular controller may be centralized or distributed, whether locally or remotely.

In addition, data processing systems may be implemented as virtual machines in a virtual machine architecture or cloud environment. For example, the processor 1002 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1000 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCOIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, that may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1000 may conform to any of the various current implementations and practices known in the art.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, that is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean: that an element is relatively near to but not in contact with a further element; or that the element is in contact with the further portion, unless the context clearly indicates otherwise.

Although certain embodiment of the present disclosure has been described in detail, those skilled in the art will understand that various changes, substitutions, variations, and improvements disclosed herein may be made without departing from the spirit and scope of the disclosure in its broadest form.

None of the description in the present patent document should be read as implying that any particular element, step, act, or function is an essential element, that must be included in the claim scope: the scope of patented subject matter is defined only by the claims.

The invention claimed is:

1. Computer-implemented method of creating an app, wherein a computer system is configured to execute the following steps of the method:

providing, by at least one processor, an app development user interface (UI) to a user for developing the app;

displaying, by the app development UI at least two workflow artifacts of a workflow of the app to the user;

capturing, by the app development UI, an intent of the user to insert an additional workflow artifact into the workflow in response to user interactions with the app development UI;

inserting, by the at least one processor, the additional workflow artifact into the workflow according to the captured user's intent;

determining, by the at least one processor, an overlap of at least two of the at least two workflow artifacts caused by the inserted workflow artifact;

determining, by the at least one processor, a flow direction of the workflow from a preceding workflow artifact to a following workflow artifact, the preceding workflow artifact and the following workflow artifact preceding and following the inserted workflow artifact, respectively;

determining, by the at least one processor, at least one workflow artifact of the workflow which needs to be moved along the determined flow direction to avoid the determined overlap;

determining, by the at least one processor, an updated workflow by moving the determined workflow artifact along the determined flow direction at least until the determined overlap is removed;

displaying, by the app development UI, at least the preceding workflow artifact, the inserted workflow artifact, and the following workflow artifact to the user;

developing, by the at least one processor, the app through the app development UI by using the updated workflow;

determining, by the at least one processor, a moving borderline the workflow, wherein the moving borderline intersects the preceding workflow artifact and is perpendicular to the determined flow direction;

determining, by the at least one processor, an updated workflow by only moving one or more workflow artifacts which are arranged in the workflow at the same side of the moving borderline as the inserted artifact or a removed workflow artifact; and deploying and running the developed app comprising the updated workflow for implementation in a runtime of the developed app in a respective target device.

2. The Computer-implemented method according to claim 1, further comprising:

determining, by the at least one processor, at least one position in the workflow at which to insert the additional workflow artifact using the captured user's intent and a trained function.

3. The Computer-implemented method according to claim 2, further comprising:

displaying, in the app development UI, the determined at least one position to the user; and capturing, with the app development UI, the user's intent to approve at least one of the determined at least one position in response to user interactions.

4. The Computer-implemented method according to claim 1, further comprising:

moving, by the at least one processor, the workflow artifacts of the workflow following the inserted artifact along the determined flow direction at least until the determined overlap is removed.

5. The Computer-implemented method according to claim 1, further comprising:

determining, by the at least one processor, the overlap of at least two of the workflow artifacts caused by a previously moved workflow artifact;

determining, by the at least one processor, the flow direction of the workflow from the preceding workflow artifact to the following workflow artifact, the preceding workflow artifact and the following workflow artifact preceding and following the previously moved workflow artifact, respectively;

determining, by the at least one processor, at least one workflow artifact of the workflow which needs to be moved along the determined flow direction to avoid the determined overlap; and determining, by the at least one processor, the updated workflow by moving the determined workflow artifact along the determined flow direction at least until the determined overlap is removed.

6. The Computer-implemented method according to claim 1, further comprising:

capturing the user's intent to remove a selected workflow artifact from the workflow in response to user interactions with the app development UI;

removing the selected workflow artifact from the workflow according to the captured user's intent;

determining, by the at least one processor, a gap between the preceding workflow artifact and the following workflow artifact, the preceding workflow artifact and the following workflow artifact preceding and following the removed workflow artifact, respectively;

determining, by the at least one processor, the flow direction of the workflow from the preceding workflow artifact to the following workflow artifact; and determining, by the at least one processor, the updated workflow by moving the following workflow artifact in opposite direction to the determined flow direction until the determined gap is closed.

7. The Computer-implemented method according to claim 1, wherein the inserted workflow artifact is inserted into a loop of workflow artifacts, the loop having a loop size and a loop border, the method further comprising:

determining, by the at least one processor, an overlap of a workflow artifact comprised by the loop and the loop border, the overlap being caused by the workflow artifact inserted into the loop; and determining, by the at least one processor, the updated workflow by expanding the loop size of the loop along the determined flow direction at least until the determined overlap is removed.

8. The Computer-implemented method according to claim 7, further comprising:

determining, by the at least one processor, an overlap of the expanded loop and the workflow artifact following the loop;

determining, by the at least one processor, the flow direction of the workflow from the expanded loop to the workflow artifact following the loop; and determining, by the at least one processor, the updated workflow by moving the workflow artifact following the loop along the determined flow direction at least until the determined overlap is removed.

9. The Computer-implemented method according to claim 1, wherein the preceding workflow artifact is a split artifact starting partial flows of the workflow, the method further comprising:

determining, by the at least one processor, the flow direction of the workflow from the following workflow artifact to the workflow artifact following the following workflow artifact; and determining, by the at least one processor, the updated workflow by arranging the inserted artifact at an initial position of the following artifact and by moving the following workflow artifact along the determined flow direction at least until the determined overlap is removed.

10. The Computer-implemented method according to claim 1, wherein the following workflow artifact is a merge artifact merging partial flows of the workflow, the method further comprising:

determining, by the at least one processor, the flow direction of the workflow from the workflow artifact preceding the preceding workflow artifact to the preceding workflow artifact;

determining, by the at least one processor, the updated workflow by moving the preceding workflow artifact in the opposite direction to the determined flow direction at least until the determined overlap is removed.

11. The Computer-implemented method according to claim 1, wherein the workflow intersects the determined moving borderline at least twice, and wherein the workflow includes a U-shape, an S-shape, or a Z-shape.

12. The Computer-implemented method according to claim 1, further comprising:

applying, by the at least one processor, the updated workflow of the developed app to input data to generate output data; and analyzing, monitoring, and/or controlling the respective target device, or a device connected to the respective target device using the generated output data and/or analyzing and/or monitoring the respective target device's user using the generated output data.

13. A non-transitory computer-readable medium including machine-readable instructions stored therein that when executed by a computer system, cause the computer system configured to execute the following steps to:

provide an app development user interface (UI) to a user for developing the app;

display at least two workflow artifacts of a workflow of the app to the user in the app development UI;

capture the user's intent to insert an additional workflow artifact into the workflow in response to user interactions with the app development UI;

insert the additional workflow artifact into the workflow according to the captured user's intent;

determine an overlap of at least two of the at least two workflow artifacts caused by the inserted workflow artifact;

determine a flow direction of the workflow from a preceding workflow artifact to the following workflow artifact, the preceding and the following workflow artifact preceding and following the inserted workflow artifact, respectively;

determine at least one workflow artifact of the workflow which needs to be moved along the determined flow direction to avoid the determined overlap;

determine an updated workflow by moving the respective, determined workflow artifact along the determined flow direction at least until the determined overlap is removed;

display at least the preceding workflow artifact, the inserted workflow artifact, and the following workflow artifact to the user in the app development UI;

develop the app through the app development UI by using the updated workflow;

determine a moving borderline in the workflow, wherein the moving borderline intersects the preceding workflow artifact and is perpendicular to the determined flow direction;

determine an updated workflow by only moving one or more workflow artifacts which are arranged in the workflow at the same side of the moving borderline as the inserted artifact or the removed workflow artifact; and deploy and run the developed app comprising the updated workflow for implementation during runtime on a respective target device.

* * * * *